US009940774B2

(12) United States Patent
Hilbert et al.

(10) Patent No.: US 9,940,774 B2
(45) Date of Patent: Apr. 10, 2018

(54) MULTI-TOUCH GESTURE GAMING SYSTEM AND METHOD

(71) Applicant: Bally Gaming, Inc., Las Vegas, CA (US)

(72) Inventors: Scott Thomas Hilbert, Sparks, NV (US); David Ponce, Las Vegas, NV (US); Joseph R. Hedrick, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 240 days.

(21) Appl. No.: 14/480,572

(22) Filed: Sep. 8, 2014

(65) Prior Publication Data

US 2016/0071354 A1 Mar. 10, 2016

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3209* (2013.01); *G07F 17/3211* (2013.01)

(58) Field of Classification Search

USPC ......... 463/1, 20, 22, 25, 30, 31, 39; 273/274

See application file for complete search history.

(56) References Cited

U.S. PATENT DOCUMENTS

2009/0021797 A1* 1/2009 Luciano ............. H04N 1/00238 358/474
2009/0115133 A1* 5/2009 Kelly .................. A63F 3/00643 273/274
2009/0325691 A1* 12/2009 Loose ..................... G07F 17/32 463/30
2011/0035691 A1* 2/2011 Kim .................... G06F 3/04817 715/765
2012/0115599 A1* 5/2012 Conway ................ G07F 17/326 463/31
2012/0169610 A1* 7/2012 Berkes ................ G06F 3/04883 345/173
2013/0135218 A1* 5/2013 Jain ....................... G06F 3/0488 345/173
2016/0078710 A1* 3/2016 Pierer ..................... G07F 17/32 463/31

* cited by examiner

*Primary Examiner* — Adetokunbo O Torimiro

(74) *Attorney, Agent, or Firm* — Seed Intellectual Property Law Group LLP

(57) ABSTRACT

Various embodiments disclosed herein are directed to a multi-touch game play system that includes a display subsystem, a sensor subsystem, and one or more computing subsystems. The display subsystem is configured to display images related to one or more games to be played on at least a first game playing surface. The images include a virtual game layout having a number of demarcations of at least one area associated with the play of the one or more games. The sensor subsystem is configured to detect multiple touch gestures, wherein gestures include simultaneous touches by multiple fingers, consecutive touches by a single finger, touching and sliding of a finger, touching and sliding of multiple fingers, and combinations thereof.

20 Claims, 21 Drawing Sheets

FIG. 18
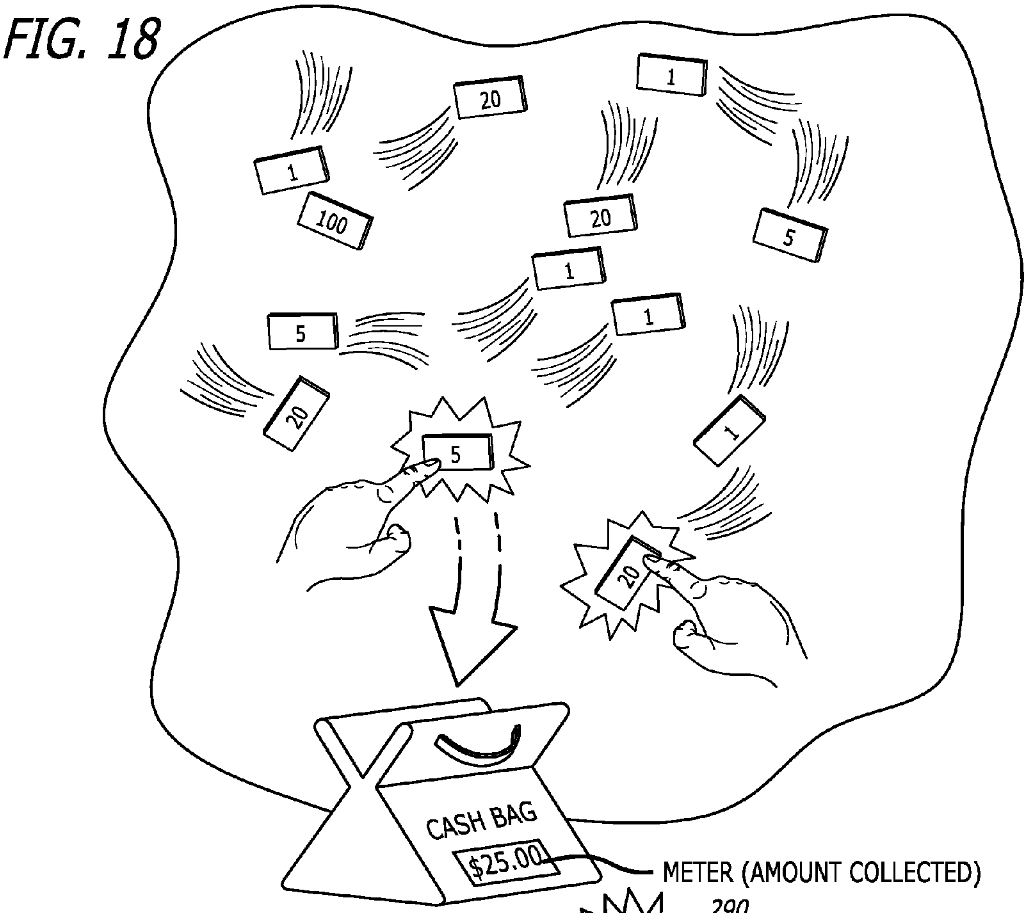
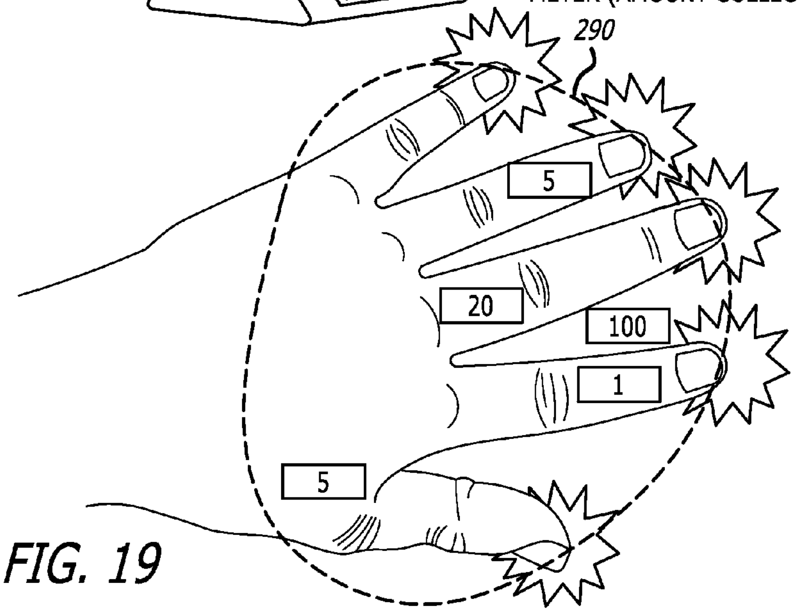
FIG. 19

MULTI-TOUCH GESTURE GAMING SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This description generally relates to entertainment or casino games which may include games with or without wagering.

BACKGROUND

There are numerous types of games that people play for entertainment or educational purposes. Some games are commonly associated with wagering. For example, roulette, craps, and many card games played with playing cards, for instance blackjack, baccarat, various types of poker, Pai Gow poker, and Let It Ride. Sometimes games commonly associated with wagering are played for fun, without the exchange of money and/or for charitable fund raisers which typically involves pretend money. Card games may be played with one or more standard decks of playing cards. A standard deck of playing cards typically comprises fifty-two playing cards, each playing card having a combination of a rank symbol and a suit symbol, selected from thirteen rank symbols (i.e., 2, 3, 4, 5, 6, 7, 8, 9, 10, J, Q, K, and A) and four suit symbols (i.e., diamond-solid., and the like). Some games may include non-standard playing cards, for example, playing cards with symbols other than the rank and suit symbols associated with a standard deck.

In recent years electronic systems have been added to table games to aid in the proper comping of players. Typically, such systems electronically detect the size of the bet or wager played by a player. The chips used by players to place bets or wagers may be marked either optically or via wireless interrogation. Chips may be marked with a bar code of some other indicia that is either visible or non-visible to the player. Alternatively, chips may carry radio frequency identification (RFID) transponders. Machine-readable symbol readers or RFID readers recognize the bet or wager by each identified player, and the appropriate comps may be credited to the patron's account based upon the size of wagers. Also, the players overall value to the casino can be calculated since both wins and losses can be electronically monitored. Table gaming bet or wager recognition has become a significant focus in the casino industry as a way to properly understand total patron value. Each of these technologies has its own fidelity and resolution issues that need to be improved upon.

Casinos and other gaming establishments are continually looking for ways to make gaming fresher and more exciting for their patrons. For example, many casinos offer the ability to place bonus wagers and/or progressive wagers. New approaches to varying existing gaming and otherwise servicing patrons are highly desirable.

The current multi-touch game offerings addresses certain of these and other needs.

SUMMARY

Briefly, and in general terms, various embodiments are directed to a multi-touch game play system that includes a display subsystem, a sensor subsystem, and one or more computing subsystems. The display subsystem is configured to display images related to one or more games to be played on at least a first game playing surface. The sensor subsystem is configured to detect multiple touch gestures, wherein gestures include simultaneous touches by multiple fingers, consecutive touches by a single finger, touching and sliding of a finger, touching and sliding of multiple fingers, and combinations thereof. The one or more computing subsystems communicatively coupled to the display subsystem to control the images displayed by the display subsystem. Additionally, one or more computing subsystems are communicatively coupled to the sensor subsystem to receive information indicative of the multiple touch gestures sensed by the sensor subsystem.

In one aspect, the gaming system may include one or more secondary displays in addition to the principal display(s). The playing surface of the gaming system may include a single surface computing display or device, or multiple surface computing displays or devices in close proximity to each other. Each player may have a respective portion of zone a of a single surface display or may have their own respective surface display.

The present game mechanic adds several new interaction methods that strive to make multi-touch intuitive and more interactive. This game mechanic is built to naturally engage players to touch the screen with both hands and enhance their winning potential. This mechanic can be re-skinned to other themes while it maintains familiarity aspects. This game mechanic involves several interaction methods or features.

In one embodiment, the game involves one or more of multi-touch—multi-object grab, object snap to center of touch point capture, and multi-touch Net grab. Further the game integrates multi-touch into the game mechanic that enhances and optimizes play for the player. Existing games have little to no multi-touch interaction and where they do it does not integrate into the game play such that multi-touch increases the players win. After a collection round, in one aspect players are offered a pick-em bonus that may augment their winnings In the prototype, the pick-em is one of three mystery banks The pick-em is added to balance out the win such that if the player fails to understand the collection part of the bonus, (collects few or no coins), they still may win a credit amount at the end. If the player collects some coins, the three choices may be two additional credit amounts (adding to their collected total) or a bonus multiplier of their total. If they collect no credits in the time round, the pick-em selections will be credit values of which they pick one ensuring some bonus award.

Other features and advantages will become apparent from the following detailed description, taken in conjunction with the accompanying drawings, which illustrate by way of example, the features of the various embodiments.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 18 is a screen view depicting alternative contemplated game features.

FIG. 19 illustrates a lassoing action of an embodiment of a game.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, and the like. In other instances, well-known structures associated with servers, networks, displays, media handling and/or printers have not been shown or described in detail to avoid unnecessarily obscuring descriptions of the embodiments.

Unless the context requires otherwise, throughout the specification and claims which follow, the word “comprise” and variations thereof, such as, “comprises” and “comprising” are to be construed in an open, inclusive sense, that is as “including, but not limited to.”

Reference throughout this specification to “one embodiment” or “an embodiment” means that a particular feature, structure or characteristic described in connection with the embodiment is included in at least one embodiment. Thus, the appearances of the phrases “in one embodiment” or “in an embodiment” in various places throughout this specification are not necessarily all referring to the same embodiment. Furthermore, the particular features, structures, or characteristics may be combined in any suitable manner in one or more embodiments.

As used in this specification and the appended claims, the singular forms “a,” “an,” and “the” include plural referents unless the content clearly dictates otherwise. It should also be noted that the term “or” is generally employed in its sense including “and/or” unless the content clearly dictates otherwise.

The headings and Abstract of the Disclosure provided herein are for convenience only and do not interpret the scope or meaning of the embodiments.

What is described in this disclosure is a form of wagering game or wagering bonus game that relies on multi-touch player interaction with the main screen or alternately, any other multi-touch equipped input device. Preferably the main display device is a multi-touch equipped input device.

Figure 1:
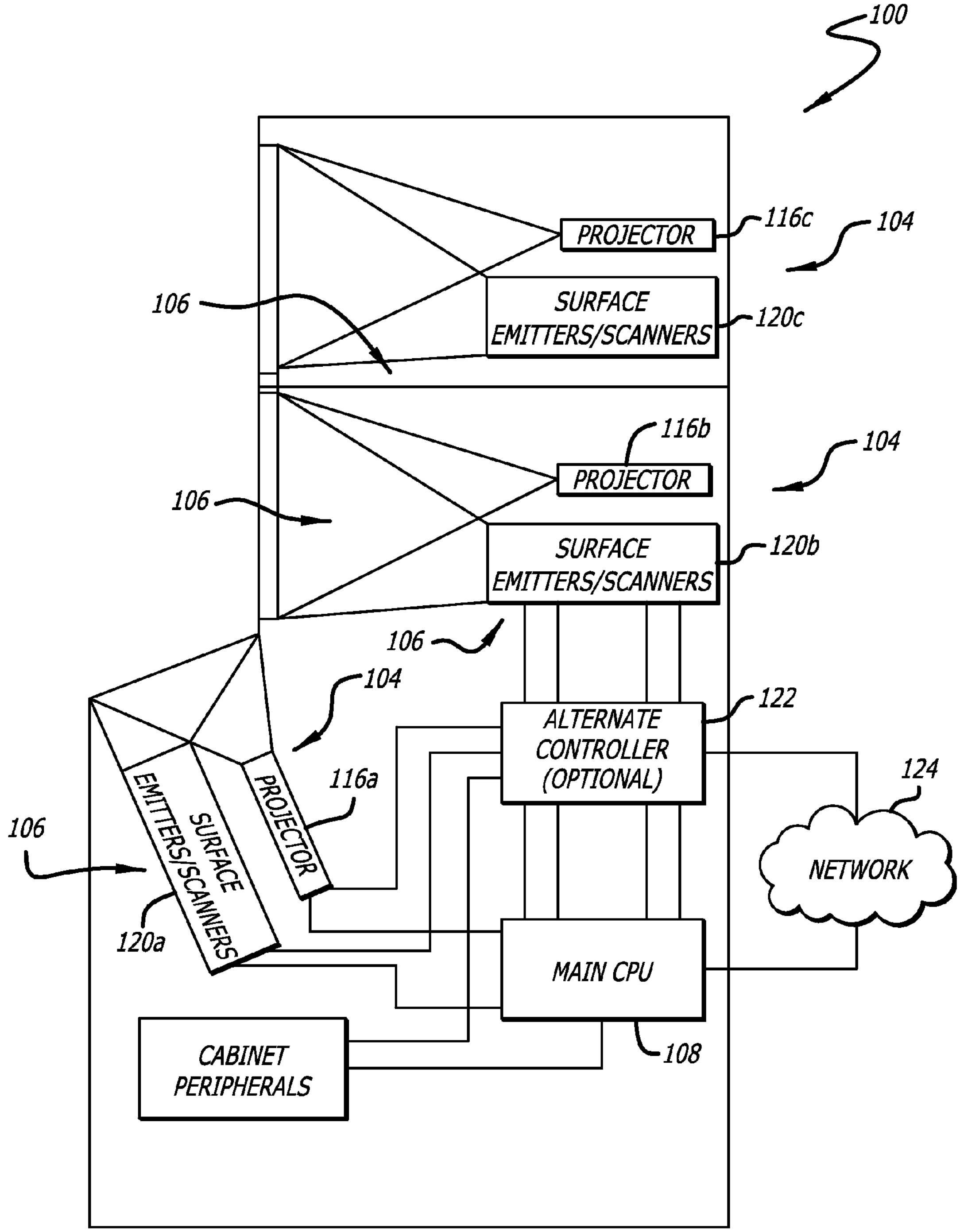
FIG. 1 is a schematic diagram of an upright or arcade style or casino style game playing system according to one illustrated embodiment, the upright or arcade/casino style game playing system including a number of display subsystems, sensor subsystems and computing subsystems communicatively coupled with the display and sensor subsystems.

The multi-touch gesture gaming system 100 includes a display subsystem 104, sensor subsystem 106 and computing subsystem 108. The display subsystem 104 may take a variety of forms. FIG. 1 illustrates the display subsystem 104 as including one or more projectors 116*a*-116*c* (collectively 116) located so as to produce respective displays visible to a player. Some embodiments may employ projectors that are externally located with respect to a housing of the multi-touch gesture gaming system 100. Still other embodiments may employ displays (e.g., CRT displays, or flat panel displays, such as LCD displays, LCOS displays, plasma displays, DLP displays, etc.).

In one embodiment of the multi-touch gesture gaming system 100 that supports the multi-touch functionality, there can be provided a sensor subsystem 106 that may take a variety of forms. FIG. 1 illustrates one embodiment of the sensor subsystem 106 as including one or more light sources and/or image capture devices 120*a*-120*c* (collectively 120). The light sources may take a variety of forms, and may be positioned to illuminate one or more playing surfaces 110*a*-110*c* (collectively 110). For example, the light sources may take the form of one or more infrared emitters. The infrared emitters may be collocated at various positions with respect to each of the playing surfaces 110 as illustrated in FIG. 1, or may be distributed under the playing surfaces 110. The image capture devices may take a variety of forms, and may be positioned to capture images of the playing surfaces 110.

For example, the image capture devices may take the form of one or more infrared sensitive cameras, for instance, charged coupled device (CCD) based cameras or complementary metal-oxide-semiconductor based (CMOS) cameras. Where multiple cameras are employed, the cameras may be collocated with respect to respective ones of the playing surfaces 110 or may be multiple cameras may be distributed under each of the playing surfaces 110.

The computing subsystem 108 can take a variety of forms. FIG. 1 illustrates one of many embodiments of the computing subsystem 108, which includes one or more main computer systems (e.g., Bally Alpha gaming device platform) 108 and an alternative controller 122. The computing subsystem 108 is communicatively coupled to at least drive the projectors 116 and to at least receive information from the image capture devices 120. The computing subsystem 108 may also be communicatively coupled to various peripherals of the multi-touch gesture gaming system 100, e.g., bill validators, coin acceptors, control panels and user interfaces, connectors that allow downloads of games or game reconfiguration. In some embodiments of the multi-touch gesture gaming system 100, the computing subsystem 108 may include one or more input/output ports communicatively coupled to cabinet security switches, dual port or IP based bill/ticket acceptors, dual port or IP based printers, cabinet alarms, game meters (electronic and physical), bar code scanners, and/or laser scanners, or optional Game monitoring units (GMU's).

In another aspect of some embodiments, the computing subsystem 108 may be communicatively coupled to one or more other components and/or systems. For example, the computer system 122 may be communicatively coupled by a network 124 to a slot management system, an accounting system, a casino marketing system, a server based game service, a service/beverage system, bonus system, download or reconfiguration system, dynamic button deck, and/or the Internet. The computing subsystem 108 may additionally or alternatively be coupled to one or more printers, currency acceptors, optional card readers, biometric measurement devices, proximity sensors, and/or management systems.

Various embodiments may employ touch screen technologies. For example, various embodiments may employ a resistive system, capacitive system or surface acoustic wave system to detect physical aspects, for example, player and/or dealer selections.

Resistive systems may include a glass panel that carries an electrically conductive layer and an electrically resistive layer, which layers are separated by spacers. The glass panel may be part of a display. The structure may also include a scratch resistant covering or layer. A current runs through the conductive layer, and the conductive and resistant layers contact at a location where touched, changing the electrical field. A controller, processor or driver converts the change in electrical field into position data, which is mapped to the virtual game layout.

Capacitive systems may include a glass panel that carries a charge storage layer. The glass panel may be part of a display. In use, when a player or dealer touches the charge storage layer, charge is transferred to the user, which changes the charge on the capacitive layer. Circuits sense or measure the change in charge. A processor, controller, or driver, may determine position data from the change in charge, which is mapped to the virtual game layout.

Alternatively, the surface may include one or more pressure sensitive layers, which may detect differences in pressure asserted by a game playing piece of player identity media. For example, one or more raised protrusions (e.g., similar to Braille cells) or printed elements (e.g., barcode elements) may be sensed and decoded.

Surface acoustic wave systems may employ a pair of transducers along perpendicular axes of a glass panel and reflectors that reflect an electrical signal sent from one transducer of each pair to the other transducer of the pair. The receiving transducer of each pair senses or measures disturbances of electrical wave. A processor, controller or driver can determine position data based on the disturbances, which is mapped atop the virtual game layout. While more costly than the other touch screen systems, surface acoustic wave systems advantageously allow transmission of almost all light. Surface acoustic wave systems are also advantageously sensitive to touches by any object, in contrast to capacitance based touch screen systems. A surface computing display such as one announced by MICROSOFT of Redmond Washington may be employed in the upright or arcade/casino style gaming system 1300.

In other embodiments, the display subsystem and/or the touch screens and/or multi-touch gesture technologies may include "in pixel" display technologies. These "in pixel" display technologies are flat panel (LCD/OLED) technologies that include a sensor element per pixel (or per sub-set of pixels) to detect touch. Sensors may be optical or of another type, but are integrated within the display pixel matrix. These "in pixel" display technologies present useful capabilities in conjunction with mobile devices. By using such "sub pixel rendering" the apparent resolution of a computer's (LCD) or (OLED) display is increased by rendering pixels to take into account the screen type's physical properties. Sub pixel rendering makes use of the fact that each pixel on a color LCD is actually composed of individual red, green, and blue (or other color sub-pixels) to anti-alias text with greater detail. Additionally, the resolution may be increased of all image types on layouts that are specifically designed to be compatible with sub-pixel rendering.

Continuing, the display subsystem and/or the touch screens may, for example, present a graphical user interface (GUI) with one or more user selectable icons Notably, using a surface computing approach may provide numerous advantages over traditional touch screens. For example, a surface computing system is capable handling multi-touch interaction, recognizing dozens and dozens of touches simultaneously, including fingers, hands, gestures and objects placed on the playing surface. Surface computing recognizes many points of contact simultaneously, not just from one finger as with a typical touch screen, but up to dozens and dozens of items at once. Additionally, users can actually "grab" digital information with their hands and interact with content through touch and gesture, without the use of a mouse or keyboard. In one embodiment, users can place physical objects on the surface to trigger different types of digital responses, including the transfer of digital content. In such an embodiment, the surface computing environment facilitates interaction between virtual or animated objects and physical objects. Also, the surface computing interface rarely or never needs recalibration as compared to traditional touch screens. Further, the horizontal form factor associated with surface computing makes it easy for several people to gather around a surface computer together, providing a collaborative, face-to-face experience. Further, the surface computing device can be designed to be easily cleaned and provide a water tight surface.

The idea of the presently presented game is to have the player use more than one touch point simultaneously to enhance their winning potential. The more simultaneous touch actions can equate to more credits earned in the game.

In the bonus game described below, the player has a fixed time to collect as many coins as possible. A skill element is added in that coins must be captured and placed into the proper piggy bank to be awarded as credits. Improperly placed coins are rejected. Also adding to the skill or perceived skill is the fact that three types of coins are available. Gold, silver and copper with values of 25, 10 and 5 credits. Credit amounts may be different to suit different pay tables, volatilities and game math styles.

An additional feature is that the number of each coin available for capture is ranked by their value. In this prototype, a majority of the coins are copper with less silver and very few gold coins. Players then must decide while playing the best methods to earn the most credits within the allotted time period. This may be collecting only gold coins but may also be collecting silver and copper as fast as possible and ignoring gold coins. Players each time can try a different approach to find the optimum strategy. The time period may be shown as a timer but may also be graphically and or audible represented by flashing colors, pulse sounds or a combination to indicate time is running out. The type of representation for the time limit may be changed to suit the player demographic.

Referring now to FIGS. 2-16, in one implementation, there is provided a "Piggy Bank Game" 200 the functionality of which can be incorporated into a gaming machine 100. The basic idea of this game is for players to try and grab as many coins as they can within a set time period. Coins are dragged by the player to one of three piggy banks Multi-touch is encouraged via the use of multiple piggybanks The game will offer three coin values or coin colors (Copper, Silver, gold for example). Coin value may be directly assigned to each type of coin as depicted in the following sketches. An alternative is to have no viably assigned value and the credit result is a mystery win at the end. The preferred embodiment is to have values assigned. At the bottom of the play field, three piggy banks will be placed each having a specific color or distinct marking relating to one of the three coin types.

During play, coins will randomly populate the game field, moving at various speeds and directions. Players will need to touch coins to capture them and then drag them to the correct piggy bank to deposit them. Players may capture more than one coin at a time, using multiple fingers and both hands. Players must drop the correct coins into each bank. Incorrect coins will not be accepted. Incorrect coins will bounce back into the playfield and may be recaptured by the player and deposited correctly.

The game is a timed round, for example 15 seconds. At the end of the timed round players collect the total value of all coins collected. Additional game elements: coins may be populated in a weighted amount depending on the math model (fewer high value coins and a majority of lower value coins). Coins may simply be colored and players collect as many of one or all types. At the end of the bonus round the award is revealed. The preferred method being that coins has defined values and unique colors with fewer high value coins and increased lower value coins in play.

Figure 2:
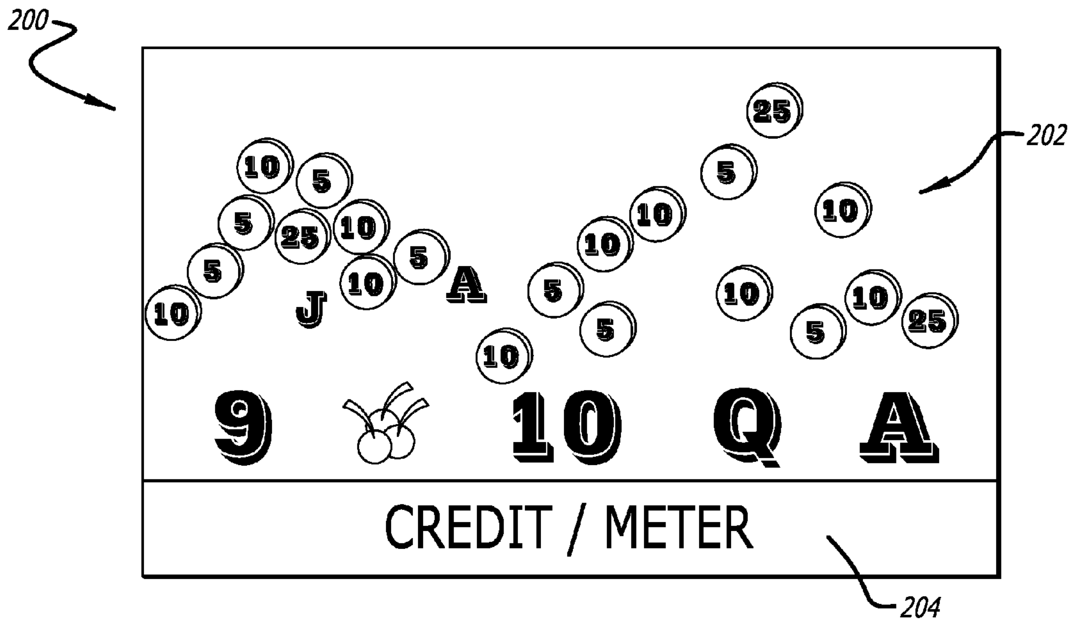
FIG. 2 is a view of a playing screen where a base game is being cleared.

With specific reference to FIG. 2, game start is described following the end of a main game spin that triggers this bonus round, a wipe screen begins where a shower of coins 202 of some other effect wipes away the base game graphics and reveals the bonus game demonstration screen 204.

Figure 3:
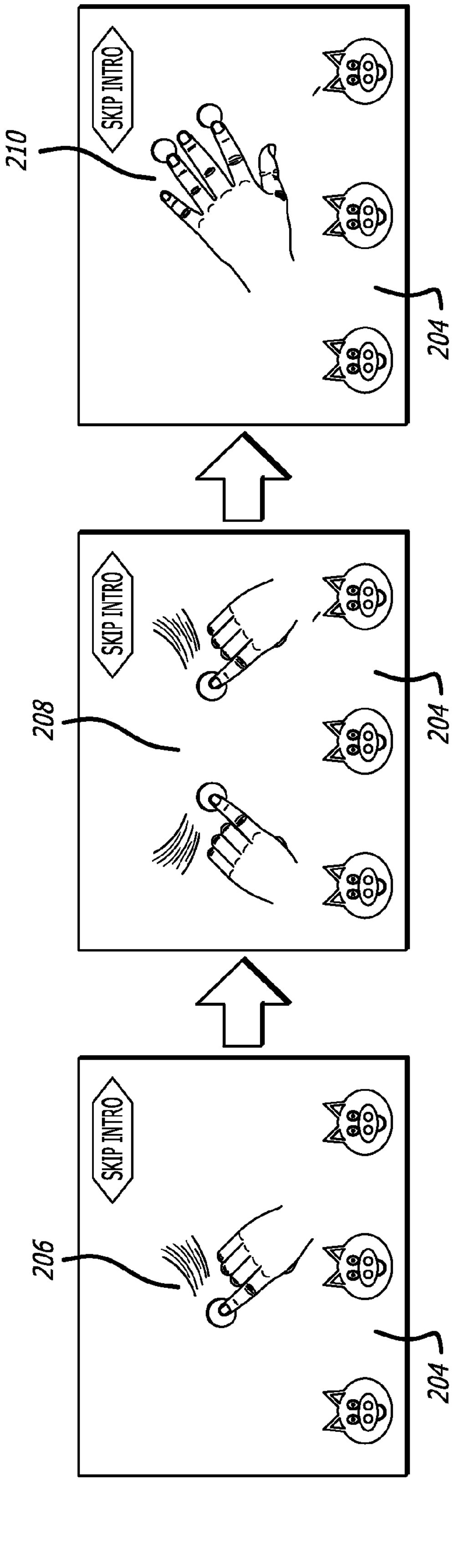
FIG. 3 are screen views showing game instruction.
Figure 4:
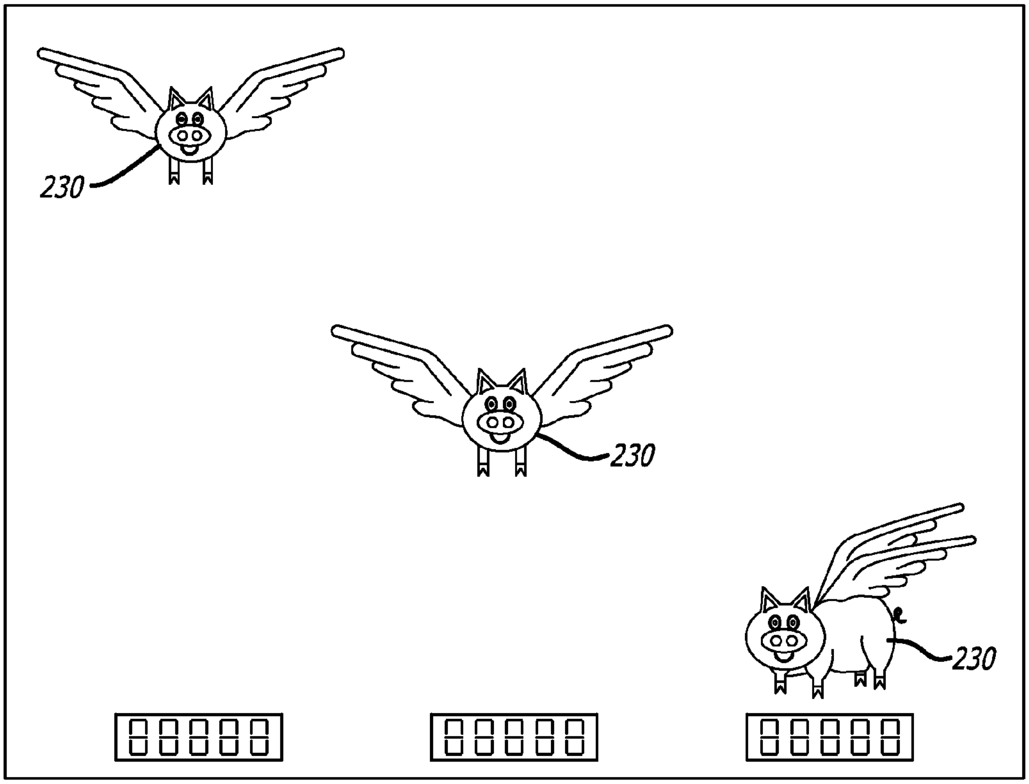
FIG. 4 is a screen view depicting game setup.

The bonus game demonstration screen shows several animations 206, 208, 210 of how to play the game (See FIG. 3). These can be playing with one hand; playing with two hands and playing with multiple coins captured with a single hand. These may be combined into a single animation sequence. Players can have an onscreen button or touch area box where they can choose to skip the introduction animations and go directly to the game. An onscreen button should also be available to replay the demo. This button could be a replay or goto bonus game button. These could be combined into a single button that shows skip introduction and then changes to replay introduction after the intro is complete.

Figure 5:
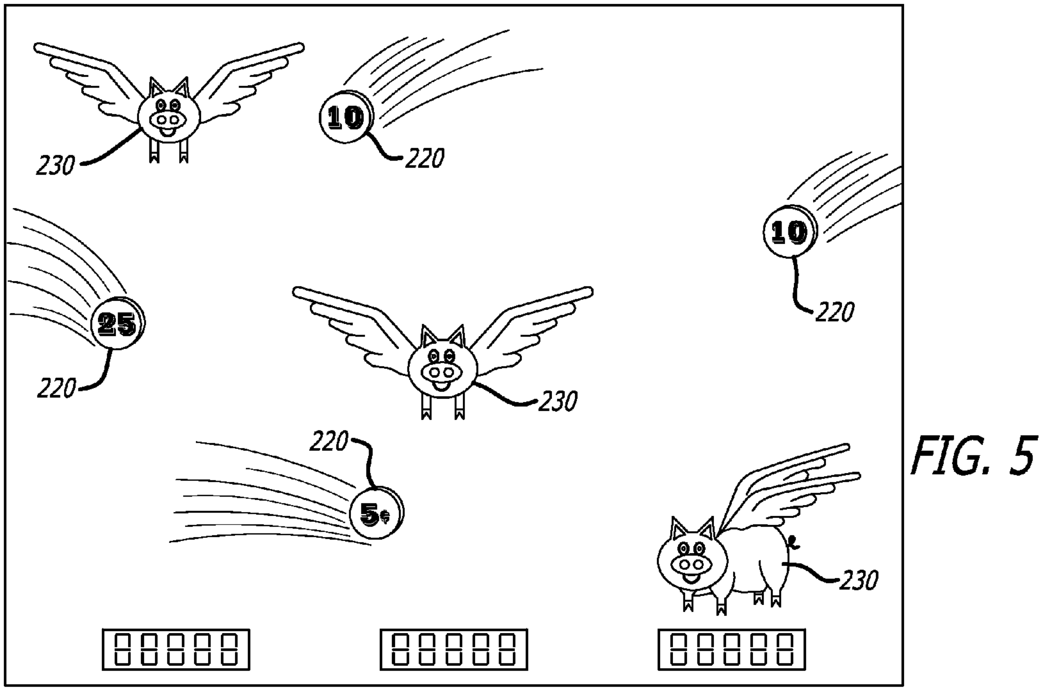
FIG. 5 is another screen view depicting game setup.
Figure 6:
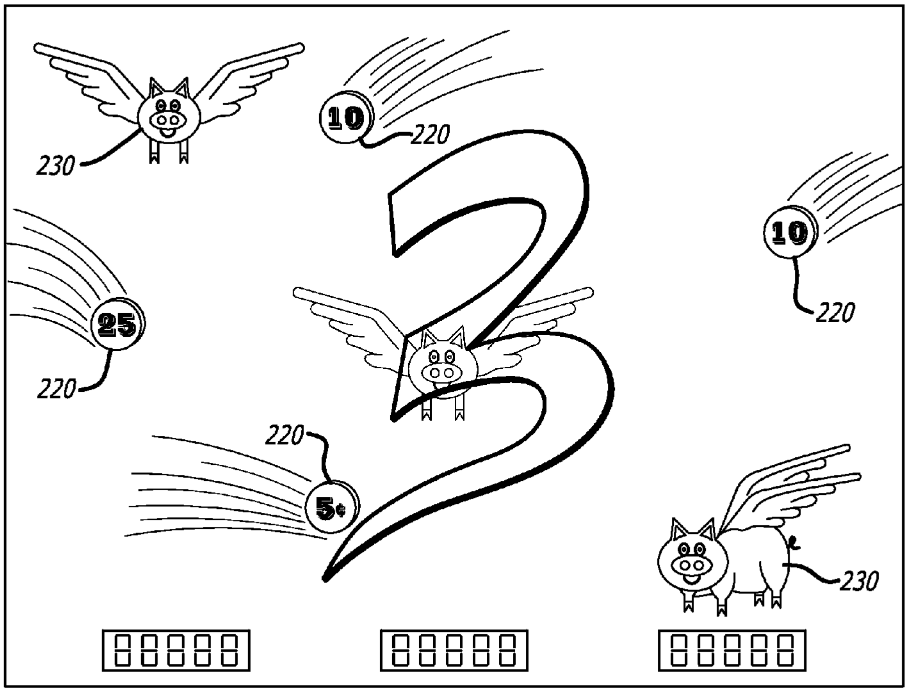
FIG. 6 is a screen view showing a first step in countdowning to game play.
Figure 7:
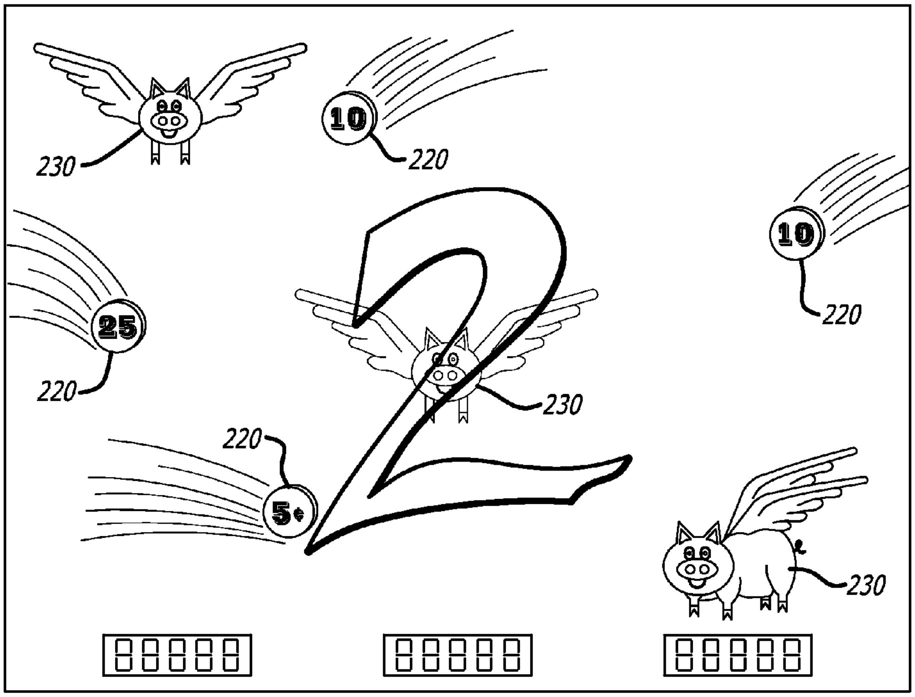
FIG. 7 is a screen view showing a second step in countdowning to game play.
Figure 8:
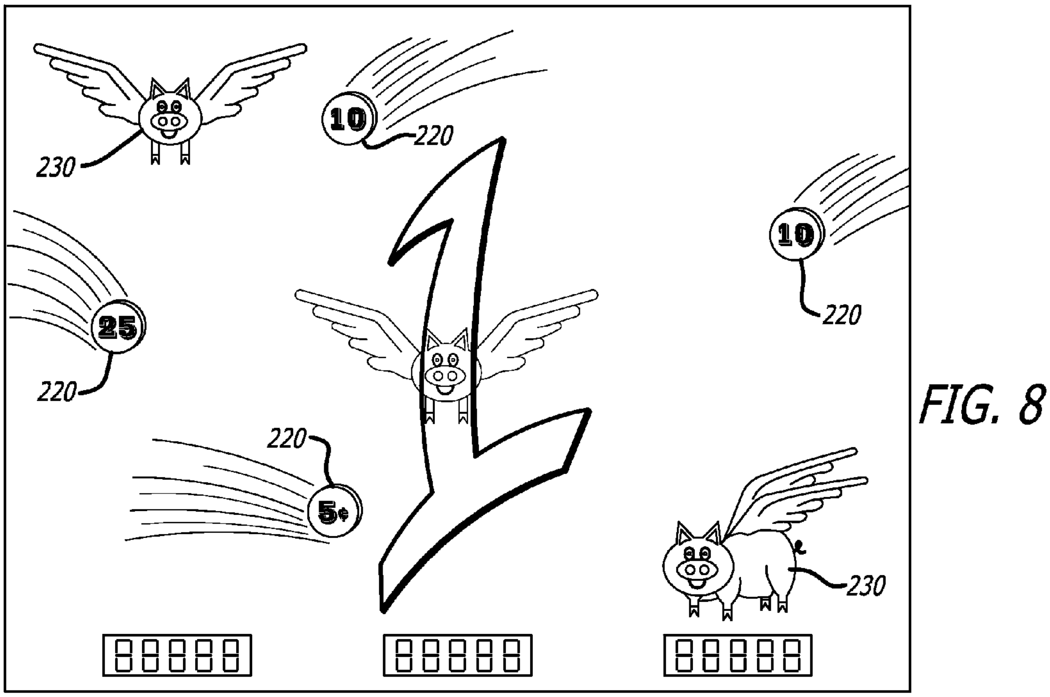
FIG. 8 is a screen view showing a third step in countdowning to game play.
Figure 9:
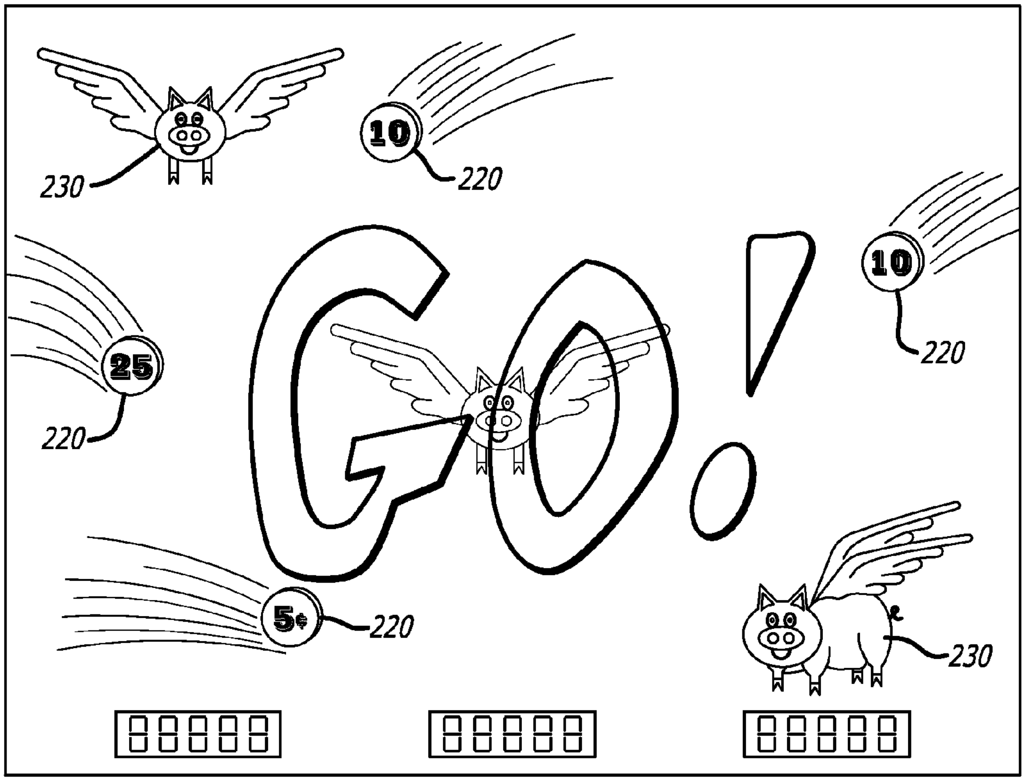
FIG. 9 is a screen view depicting game commencement.

Upon completion or skip of the introduction animations the game transitions to the game start sequence. The bonus screen is then displayed and the start countdown begins "3 . . . 2 . . . 1 . . . GO!" As shown in FIG. 5, during the countdown cycle, coins 220 begin populating the game screen. The piggy banks 230 fly in one at a time; one for each countdown of 3 . . . 2 . . . 1 . . . (See FIGS. 6-8). Coins continue to populate the game screen such that play field is fully populated with coins when the game begins. As piggy banks 230 fly in, coins begin populating the game screen. As piggy banks 230 fly in one by one, each is proceeded by the start countdown number, 3 . . . 2 . . . 1 . . . . Once all three piggy banks 230 are in place and game filed populated with coins . . . GO! is displayed and the game begins (See FIG. 9).

Figure 10:
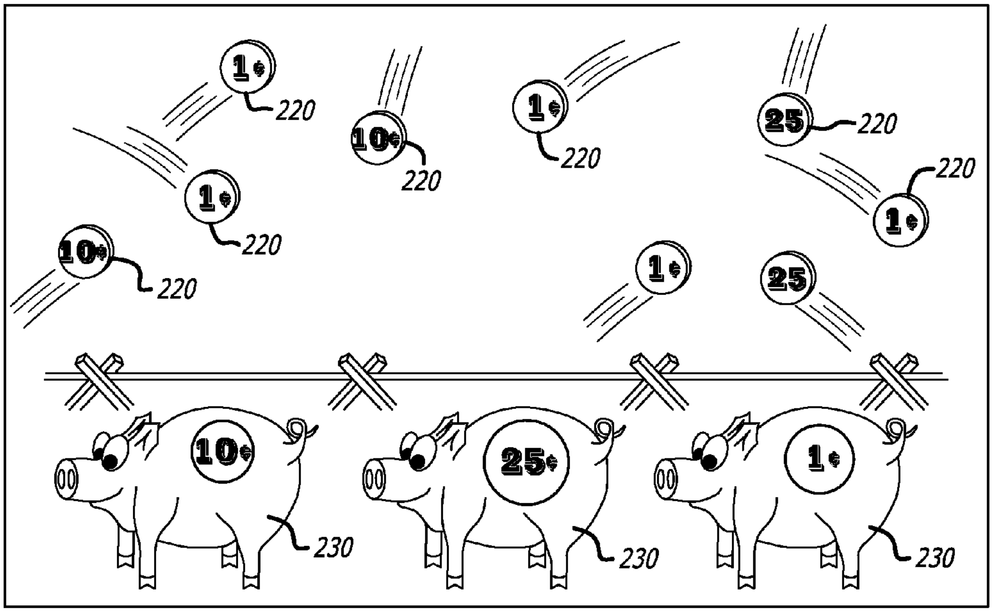
FIG. 10 is a screen view showing game action.

As can be appreciated by FIG. 10, coins 220 are allowed to fly in from top, left and right. Coins bounce off the bottom of the screen back into play. Coins may fly back off the screen to the top left and right and are randomly replaced by new coins.

Figure 11:
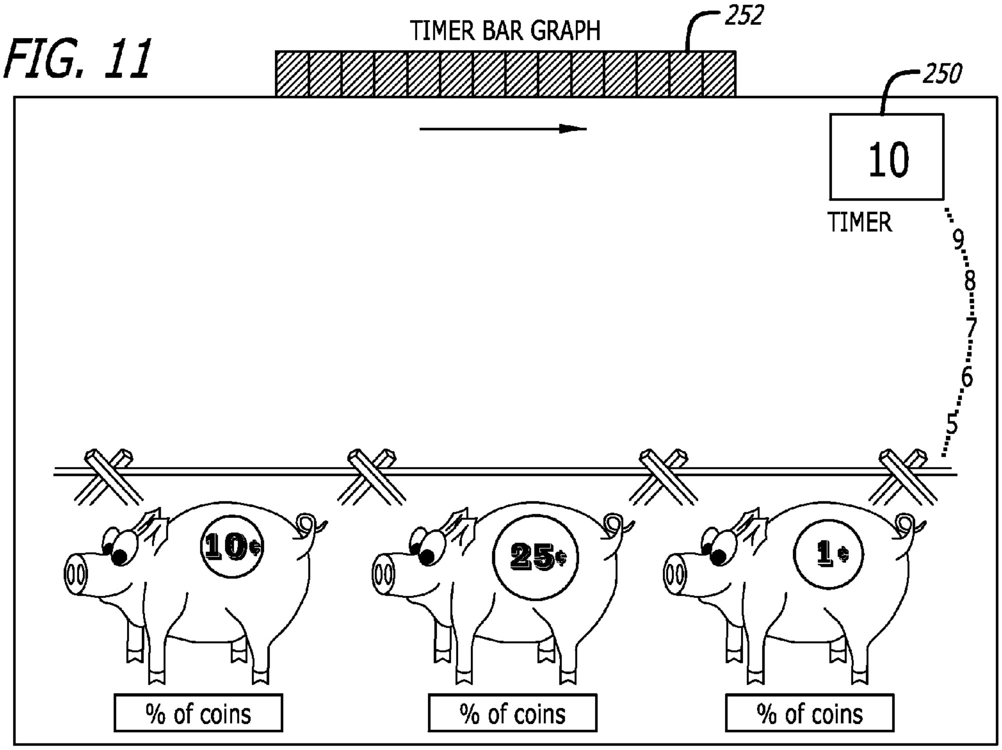
FIG. 11 is a screen view showing counter and timer features.

As shown in FIG. 11, the game screen will contain a countdown timer 250, digital or analog stopwatch with a bar graph 252 at the top of the screen. The bar graph 252 will move from green to yellow, orange and finally red just before the timer expires. The bar graph 252 should pulse/glow as the time reduces to the red zone. A sound such as a heartbeat or anticipation sound should get louder and faster as the time decreases. It is contemplated that piggy banks 230 should be colored different or have other cues that help the player easily identify what coins go to that bank.

Figure 12:
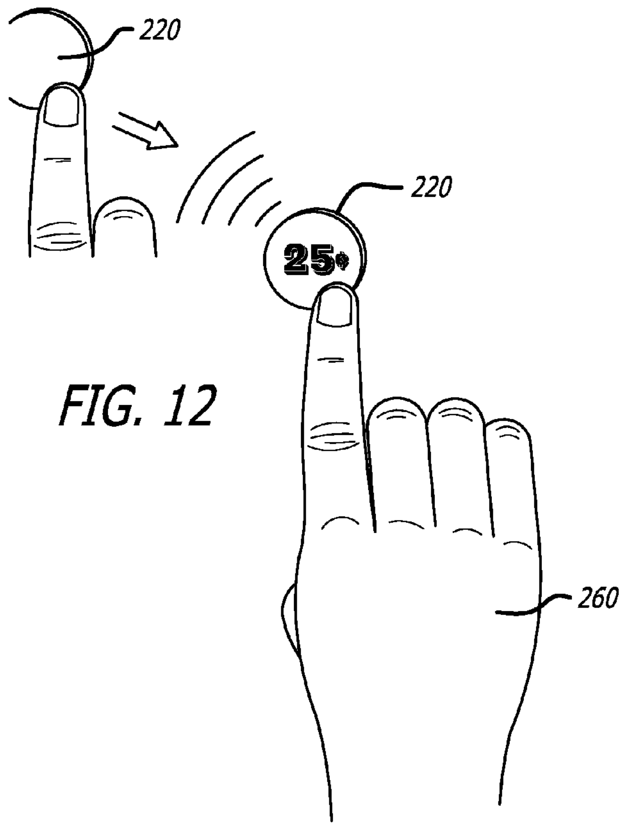
FIG. 12 depicts interactions between a player and the game.
Figure 13:
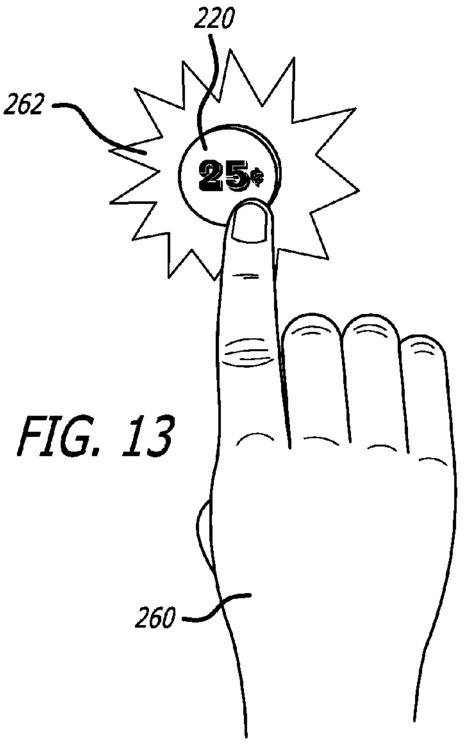
FIG. 13 depicts further possible interactions between a player and the game.
Figure 14:
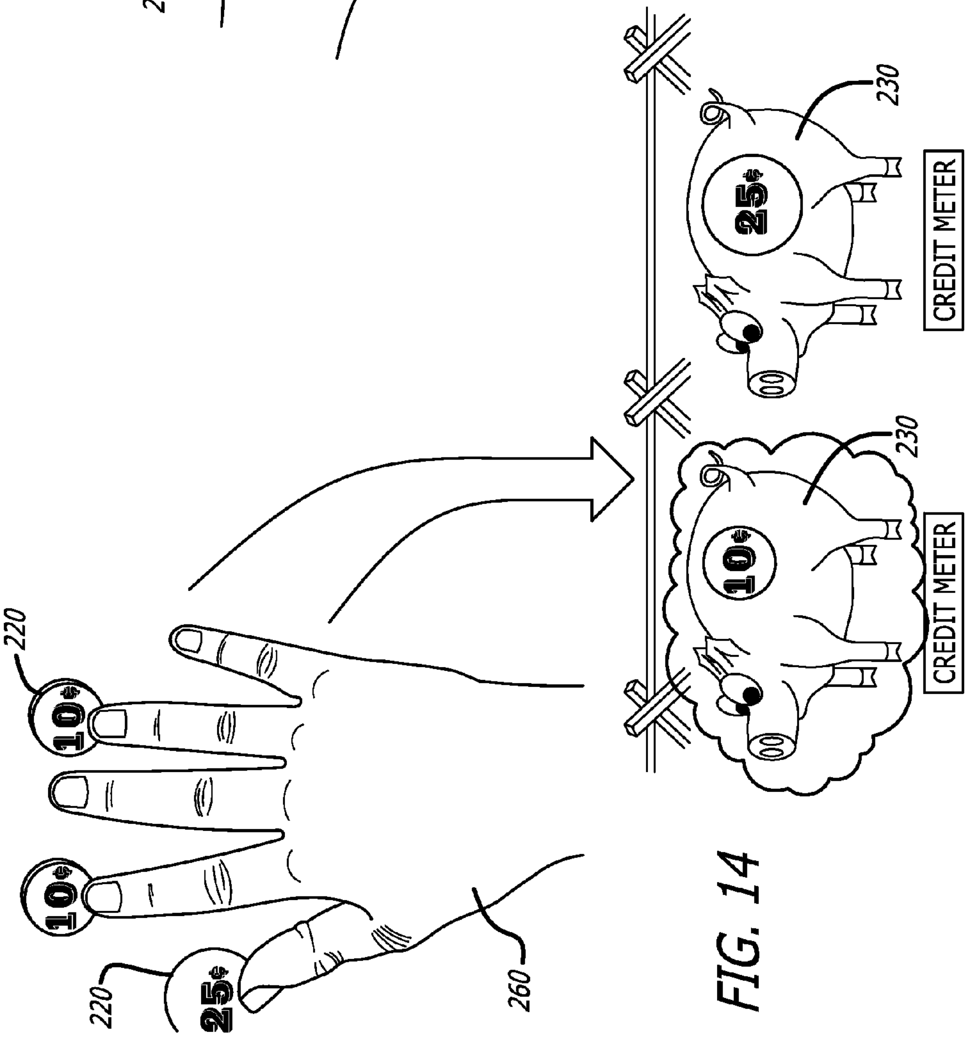
FIG. 14 depicts yet further aspects of game interaction.

As can be appreciated by FIGS. 12-14, players must touch the moving coin to capture it. Once touched the coin is held at the players touch point until the player releases the touch. The player must drag the coin to the correct piggy bank 230 to deposit it before releasing the touch. A released touch before getting to a piggy bank 230 places the coin 220 back into play. Players 260 must touch a part of the coin. If the player touches the edge of the coin, the coin will snap to the center of the touch area. Coins 220 that are captured by touch should glow 262 or have some graphical and audio feedback to show the player they have captured the coin.

Players may touch multiple coins—grab multiple coins by using more than one finger and/or both hands (See FIG. 14). They may try to drag them all to one bank. Only those of the correct denomination will be accepted.

Figure 15:
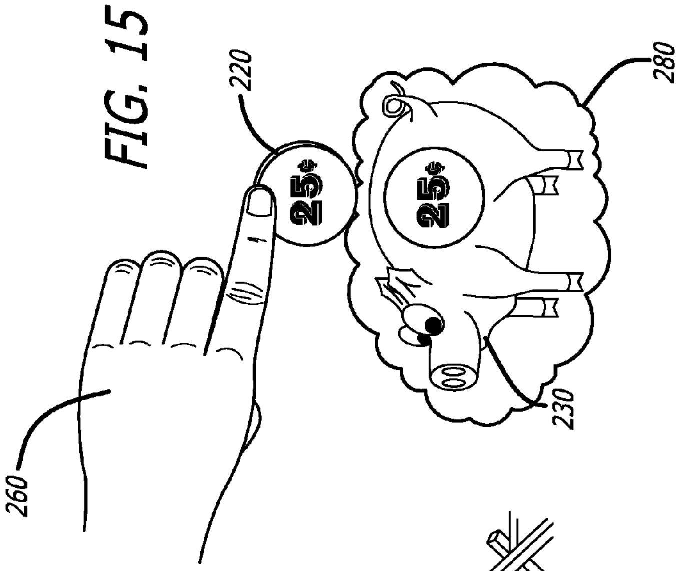
FIG. 15 is a screen shot that illustrates an active region around a bank.

With reference to FIG. 15, there is also contemplated a piggy bank active region 270. Banks 230 must have an active region 270 around them where the player simply needs to get the coins into the region to be accepted. The region 220 could be a halo/highlighted area or some other graphics. The active region 270 should be as large as possible around pigs 230 (touching any part of the piggy bank 230 allows the coin to be accepted). Piggy banks 230 should begin small and grow in size as the credit amount in them increases. Growth increase is based on credit amount and not the number of coins in the bank. The larger denomination 230 bank will grow faster with the same number of coins as a lower denomination piggy bank 230.

Figure 16:
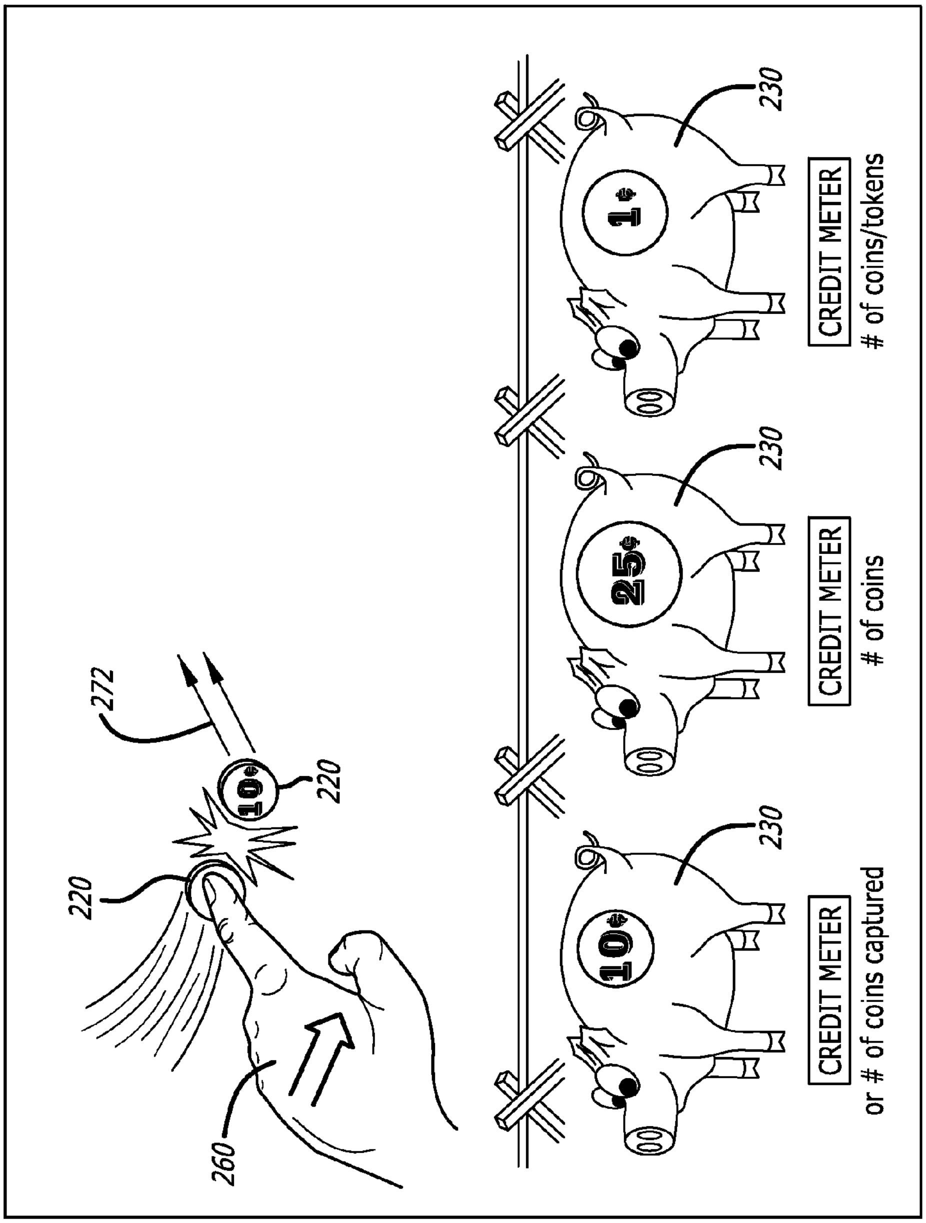
FIG. 16 is a screen shot that illustrates game physics.
Figure 17:
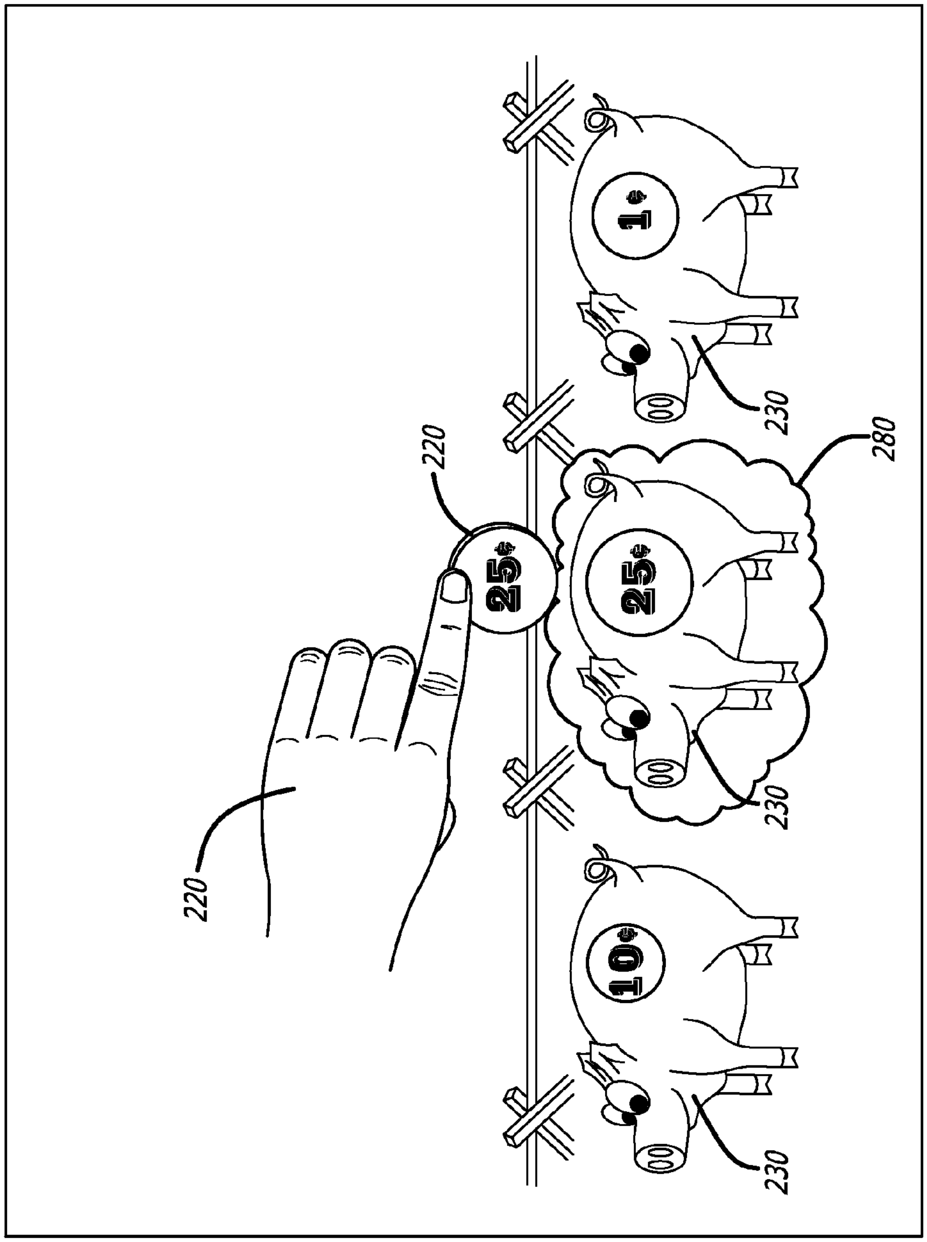
FIG. 17 is a screen shot that illustrates proper placement enhancement features.

In one approach, coins can have physics (See FIG. 16). For example, if a player drags coin(s) through the play field, coins that are in the way are bounced (ricochet) 272 out of the way.

Moreover, there can be reject actions. Coins 220 accepted by the bank 230 cause it to flash 280 or provide some visual cue with a unique sound generated for this event. Coins 220 rejected should have their own unique sound to alert the player—a visual cue would also be desired.

Further, the game can include multiplier coins or symbols. Thus, the game should randomly offer up bonus multiplier coins that if captured could work one of the following ways. Multiplier coins of a specific color/denom when deposited in the correct bank multiply the total currently in the bank by that amount. Multiplier coins are non-bank specific and multiply the player chosen bank by that amount instantly. For either of the above, the multiplier could be persistent for the entire bonus round or timed to expire after a short time period. Multiple types of bonus coins/tokens/gems should be offered such as but not limited to: multipliers; slow down (slows down the coins on the screen for easier capture); instant capture (instantly captures all the coins of that type when the bonus coin is captured); extra time gems can fly through and add 5-10 seconds of game play to the bonus round if touched.

In an alternative implementation, there can be a game goal to capture as many coins within a time period. The player tries to capture as many coins as they can in a fixed time period, 30 seconds. Coins are of three denominations (values) GOLD, SILVER and BRONZE. Players capture coins by touching the main screen and dragging coins to one of three piggy banks Piggy banks correspond to the three coin types GOLD, SILVER and BRONZE. Players must deposit the correct coin type in each piggy bank. Correct coins dragged to a piggy bank are accepted. Incorrect coins are rejected and bounce out. Special coins may appear randomly, such as multipliers that when touched or captured benefit he player. (see game concept document) Players may use single touch or various methods for multi-touch. Multi-touch may be multiple fingers on a single hand or both hands. Bonus win is awarded based on the number of coins collected of each denomination and a multiplier determined by the collection percentage (Captured v. Missed). In one particular approach, certain of these aspects can be embodied in a cash grab game (See FIG. 18).

Moreover, coin values are implied by the color (Metal) with Gold being highest value and Bronze being the lowest. The number of coins presented to the player for capture during game play needs to be weighted such that high value coins are less common and lower value coins are more common. (The idea is to add an element of strategy for the player: "Do I watch for an try to get just the GOLD coins (which are fewer) or go for a lot of Bronze coins")

Figure 20:
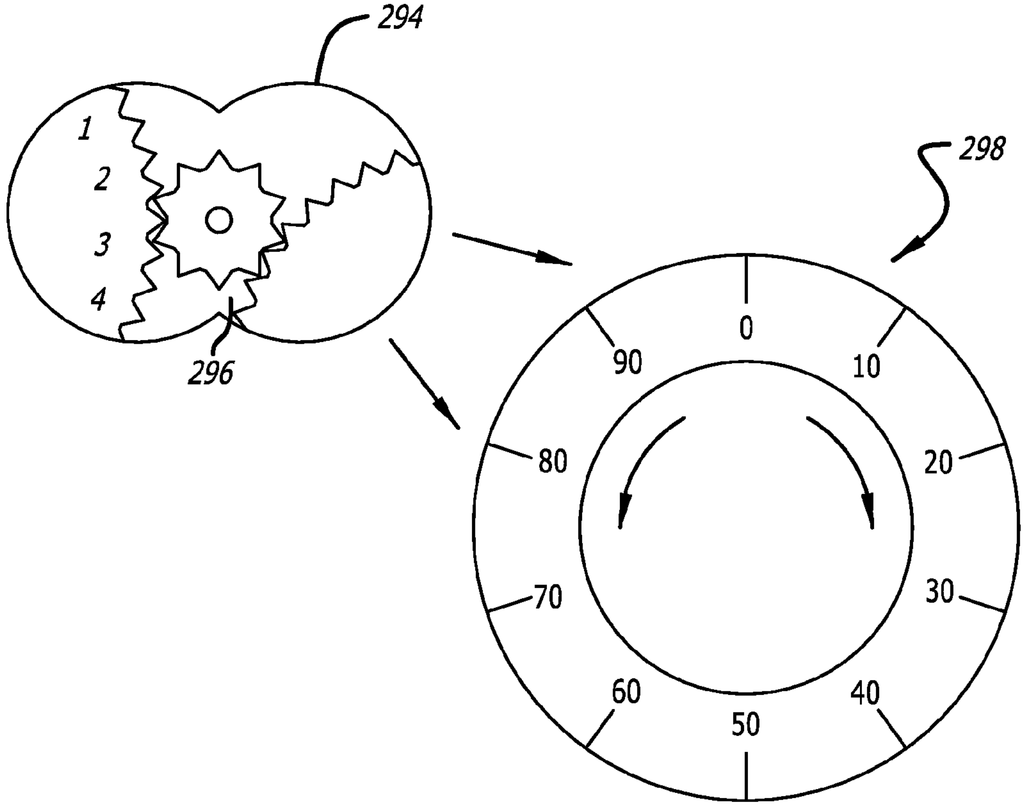
FIG. 20 depicts further alternative embodiments of game play.

Further, other multi-touch mechanics can include Lasso roping (See FIG. 19). Here, a player uses fingers to stretch a lasso 290 around objects. For example, such an action can be used to capture; net drag and toss to capture; pick gems from a pile use one or more fingers to push objects out of the way and capture exposed gems with the other hand. In yet another approach (FIG. 20), there can be provided an x-ray scope 294 as shown above where player uses scope to look inside a black box 296 while performing another operation 298 with the other hand to unlock treasure.

Figure 21:
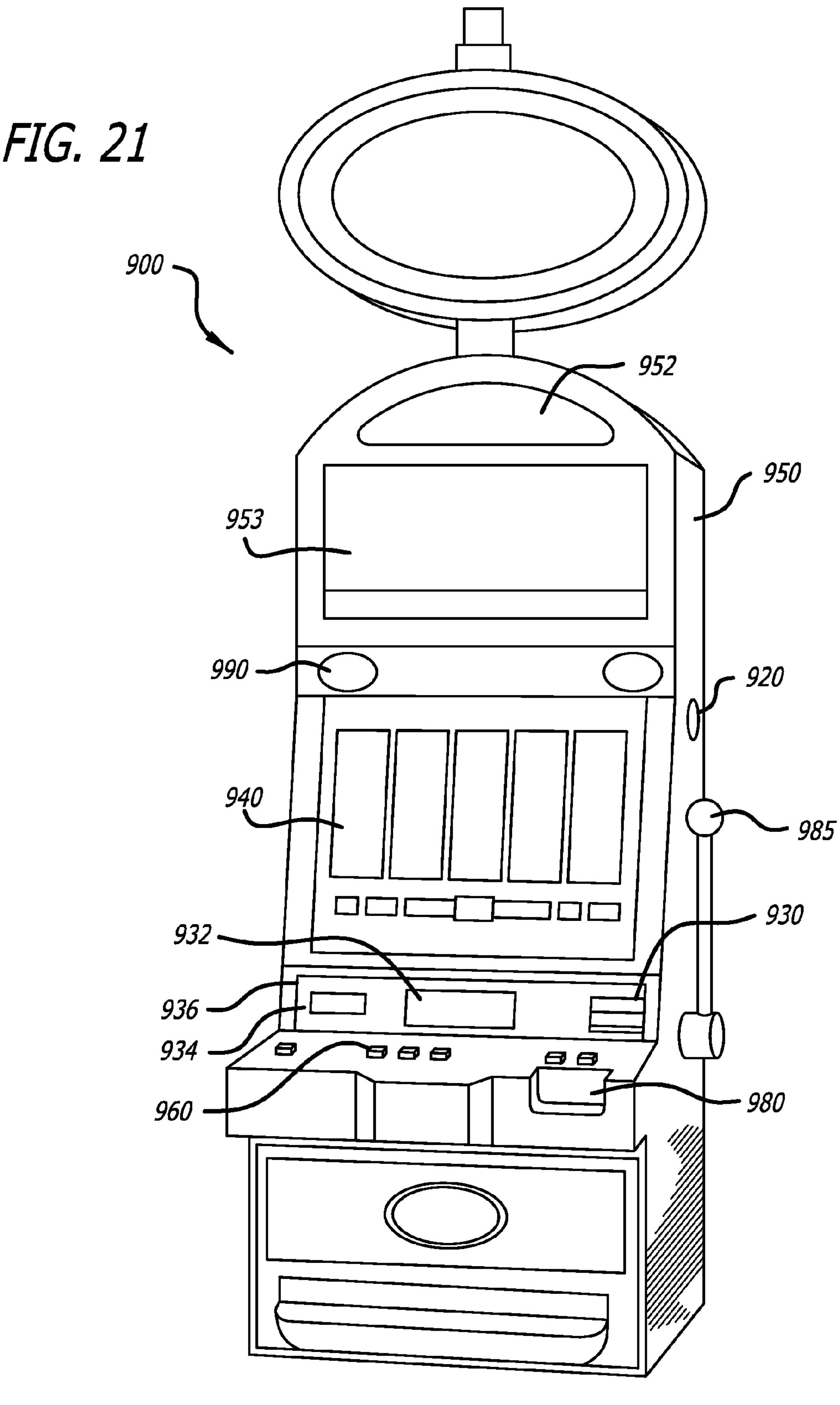
FIG. 21 is a perspective view of a gaming machine in accordance with one or more embodiments.

Referring to FIG. 21, various of the foregoing aspects can be incorporated into a gaming machine 900. The gaming machine 900 can include cabinet housing 920, primary game display 940 upon which a primary game and feature game may be displayed, top box 950 which may display multiple progressives that may be won during play of the feature game, player-activated buttons 960, player tracking panel 936, bill/voucher acceptor 980 and one or more speakers 990. Cabinet housing 920 may be a self-standing unit that is generally rectangular in shape and may be manufactured with reinforced steel or other rigid materials which are resistant to tampering and vandalism. Cabinet housing 920 may alternatively be a handheld device including the gaming functionality as discussed herein and including various of the described components herein. For example, a handheld device may be a cell phone, personal data assistant, or laptop or tablet computer, each of which may include a display, a processor, and memory sufficient to support either stand-alone capability such as gaming machine 900 or thin client capability such as that incorporating some of the capability of a remote server.

In one or more embodiments, cabinet housing 920 houses a processor, circuitry, and software (not shown) for receiving signals from the player-activated buttons 960, operating the games, and transmitting signals to the respective displays and speakers. Any shaped cabinet may be implemented with any embodiment of gaming machine 900 so long as it provides access to a player for playing a game. For example, cabinet 920 may comprise a slant-top, bar-top, or table-top style cabinet, including a Bally Cinevision™ or CineReels™ cabinet. The operation of gaming machine 900 is described more fully below.

The plurality of player-activated buttons 960 may be used for various functions such as, but not limited to, selecting a wager denomination, selecting a game to be played, selecting a wager amount per game, initiating a game, or cashing out money from gaming machine 900. Buttons 960 may be operable as input mechanisms and may include mechanical buttons, electromechanical buttons or touch screen buttons. Optionally, a handle 985 may be rotated by a player to initiate a game.

In one or more embodiments, buttons 960 may be replaced with various other input mechanisms known in the art such as, but not limited to, a touch screen system, touch pad, track ball, mouse, switches, toggle switches, or other input means used to accept player input such as the Bally iDeck™. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand.

Cabinet housing 920 may optionally include top box 950 which contains "top glass" 952 comprising advertising or payout information related to the game or games available on gaming machine 900. Player tracking panel 936 includes player tracking card reader 934 and player tracking display 932. Voucher printer 930 may be integrated into player tracking panel 936 or installed elsewhere in cabinet housing 920 or top box 950.

Game display 940 may present a game of chance wherein a player receives one or more outcomes from a set of potential outcomes. For example, one such game of chance is a video slot machine game. In other aspects of the disclosure, gaming machine 900 may present a video or mechanical reel slot machine, a video poker game, a video keno game, a lottery game, a bingo game, a Class II bingo game, a roulette game, a craps game, a blackjack game, a mechanical or video representation of a wheel game or the like.

Mechanical or video/mechanical embodiments may include game displays such as mechanical reels, wheels, or dice as required to present the game to the player. In video/mechanical or pure video embodiments, game display 940 is, typically, a CRT or a flat-panel display in the form of, but not limited to, liquid crystal, plasma, electroluminescent, vacuum fluorescent, field emission, or any other type of panel display known or developed in the art. Game display 940 may be mounted in either a "portrait" or "landscape" orientation and be of standard or "wide screen" dimensions (i.e., a ratio of one dimension to another of at least 16×9). For example, a wide screen display may be 32 inches wide by 18 inches tall. A wide screen display in a "portrait" orientation may be 32 inches tall by 18 inches wide. Additionally, game display 940 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference in its entirety for all purposes.

Game display 940 may also present information such as, but not limited to, player information, advertisements and casino promotions, graphic displays, news and sports updates, or even offer an alternate game. This information may be generated through a host computer networked with gaming machine 900 on its own initiative or it may be obtained by request of the player using either one or more of the plurality of player-activated buttons 960; the game display itself, if game display 940 comprises a touch screen or similar technology; buttons (not shown) mounted about game display 940 which may permit selections such as those found on an ATM machine, where legends on the screen are associated with respective selecting buttons; or any player input device that offers the required functionality.

Cabinet housing 920 incorporates a single game display 940. However, in alternate embodiments, cabinet housing 920 or top box 950 may house one or more additional displays 953 or components used for various purposes including additional game play screens, animated "top glass," progressive meters or mechanical or electromechanical devices (not shown) such as, but not limited to, wheels, pointers or reels. The additional displays mayor may not include a touch screen or touch glass system.

The gaming machine 900 includes various electronic components for generating sound. Note that the functionality discussed herein may be implemented using software and/or hardware techniques and components known to those skilled in the art. The processor with associated memory (not shown) may provide digital sound files, e.g., in a WAV or MP3 format, to a sound card (not shown). Particular sound files may be selected by the processor to enable the gaming machine 900 to make various sounds according to factors such as whether the machine is being played, and whether a jackpot has been won. A typical sound card includes a digital signal processor (DSP) that handles most computations, a digital to analog converter (DAC) for audio leaving the card, a read-only memory (ROM) or Flash memory for storing data, and a jack for connecting to speakers 990. Moreover, the sound card may have a microphone jack and an analog-to-digital converter (ADC) for converting analog audio signals from a microphone (not shown). The sound card translates the control signals to left- and right-channel (and any other channels) audio signals that produce sound by exciting the speakers 990.

Note that two audio channels are used to provide a stereo effect in the present example, but fewer or more channels may be used according to the audio quality or effect that is desired. For example, multiple channels of audio may be used to provide multiple sounds such as stereo music and the like.

Figure 22A:
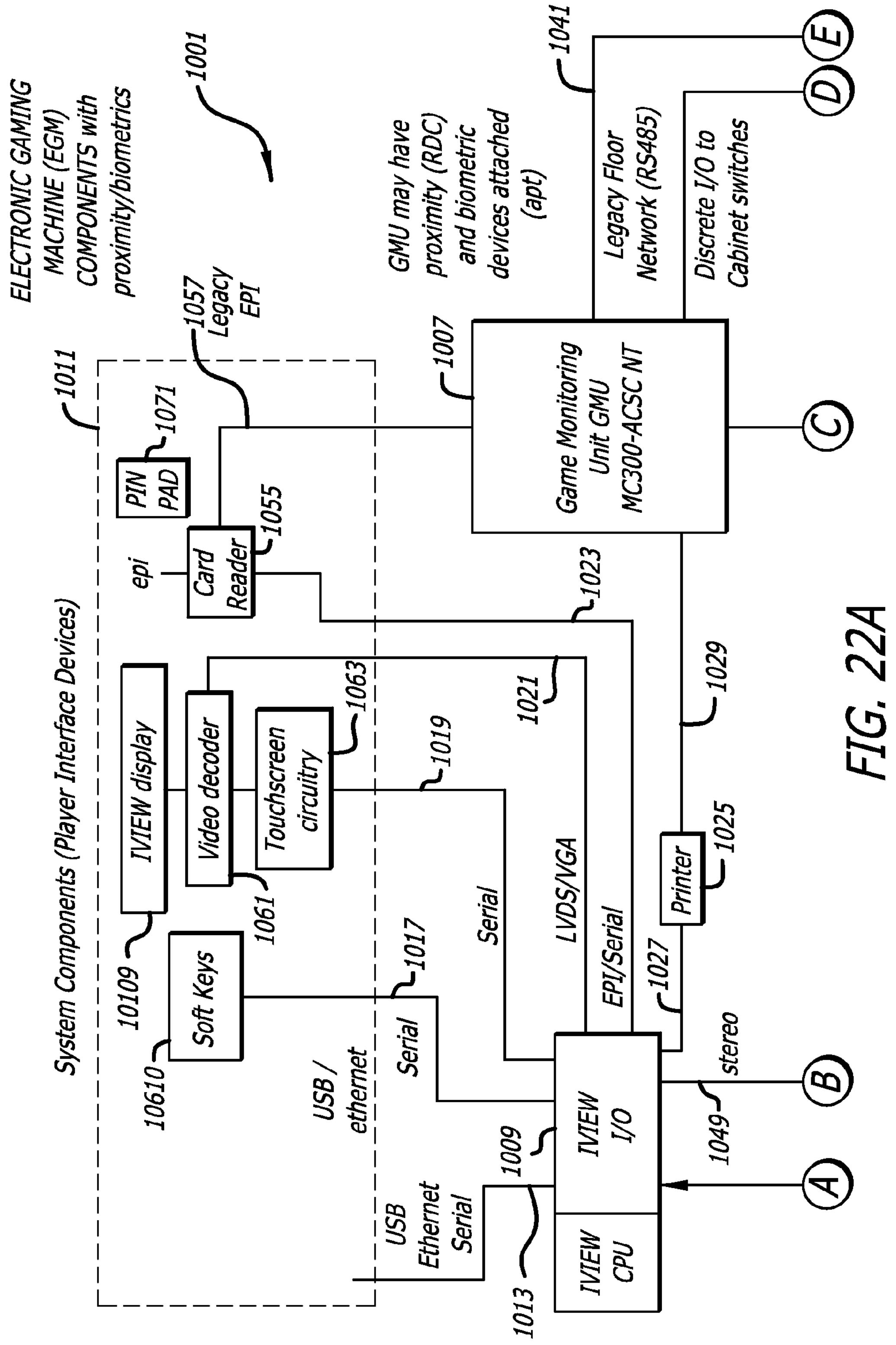
FIG. 22*a* is a block diagram of the physical and logical components of a gaming machine in accordance with one or more embodiments.
Figure 22B:
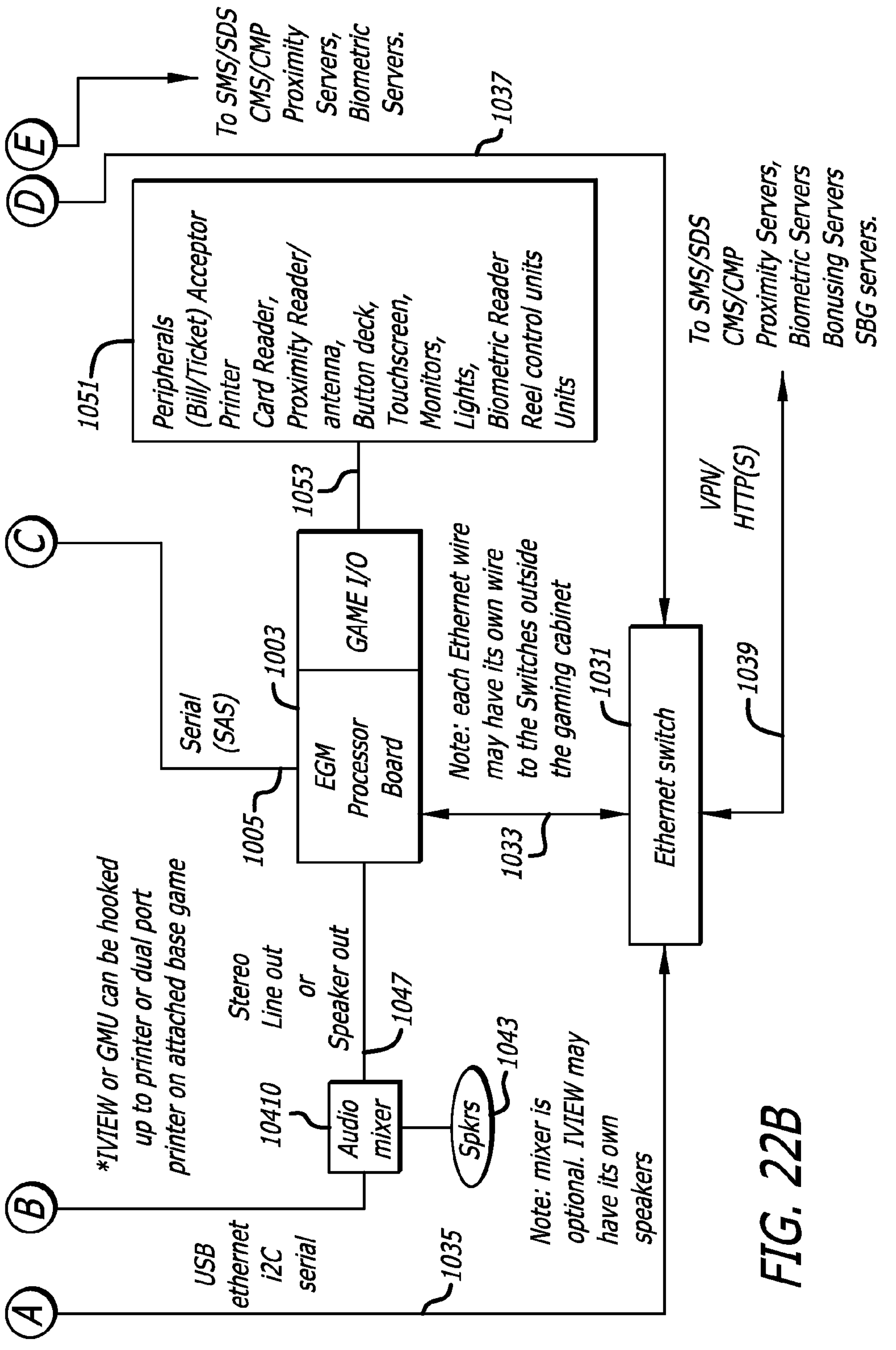
FIGS. 22*b* is a block diagram of the physical and logical components of a gaming machine in accordance with one or more embodiments.

Referring to FIGS. 22*a-b*, electronic gaming machine 1001 is shown in accordance with one or more embodiments. Electronic gaming machine 1001 includes base game integrated circuit board 1003 (EGM Processor Board) connected through serial bus line 1005 to game monitoring unit (GMU) 1007 (such as a Bally MC300 or ACSC NT), and player interface integrated circuit board (PIB) 1009 connected to player interface devices 1011 over bus lines 1013, 1015, 1017, 1019, 1021, 1023. Printer 1025 is connected to PIB 1009 and GMU 1007 over bus lines 1027, 1029. Base game integrated circuit board 1003, PIB 1009, and GMU 1007 connect to Ethernet switch 1031 over bus lines 1033, 1035, 1037. Ethernet switch 1031 connects to a slot management system (SMS) and a casino management system (CMS) network over bus line 1039. GMU 1007 also may connect to the SMS and CMS network over bus line 1041. Speakers 1043 connect through audio mixer 1045 and bus lines 1047, 1049 to base game integrated circuit board 1003 and PIB 1009. The proximity and biometric devices and circuitry may be installed by upgrading a commercially available PIB 1009, such as a Bally iView unit. Coding executed on base game integrated circuit board 1003, PIB 1009, and/or GMU 1007 may be upgraded to integrate a game having adjustable multi-part indicia as is more fully described herein.

Peripherals 1051 connect through i/o board 1053 to base game integrated circuit board 1003. For example, a bill/ticket acceptor is typically connected to a game input-output board 1053 which is, in turn, connected to a conventional central processing unit ("CPU") base game integrated circuit board 1003, such as an Intel Pentium microprocessor mounted on a gaming motherboard. 110 board 1053 may be connected to base game integrated circuit board 1003 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Base game integrated circuit board 1003 executes a game program that causes base game integrated circuit board 1003 to play a game. In one embodiment, the game program provides a slot machine game having adjustable multi-part indicia. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of 110 board 1053 to base game integrated circuit board 1003 which, in turn, assigns an appropriate number of credits for play in accordance with the game program. The player may further control the operation of the gaming machine by way of other peripherals 1051, for example, to select the amount to wager via electromechanical or touch screen buttons. The game starts in response to the player operating a start mechanism such as a handle or touch screen icon, including the icons described above with respect to the Bally iDeck™. The game program includes a random number generator to provide a display of randomly selected indicia on one or more displays. In some embodiments, the random generator may be physically separate from gaming machine 1000; for example, it may be part of a central determination host system which provides random game outcomes to the game program. Thereafter, the player mayor may not interact with the game through electromechanical or touch screen buttons to change the displayed indicia. Finally, base game integrated circuit board 1003 under control of the game program and OS compares the final display of indicia to a pay table. The set of possible game outcomes may include a subset of outcomes related to the triggering of a feature game. In the event the displayed outcome is a member of this subset, base game integrated circuit board 1003, under control of the game program and by way of 110 Board 1053, may cause feature game play to be presented on a feature display.

Predetermined payout amounts for certain outcomes, including feature game outcomes, are stored as part of the game program. Such payout amounts are, in response to instructions from base game integrated circuit board 1003, provided to the player in the form of coins, credits or currency via 110 board 1053 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 1007 includes an integrated circuit board and GMU processor and memory including coding for network communications, such as the G2S (game-to-system) protocol from the Gaming Standards Association, Las Vegas, N.V., used for system communications over the network. As shown, GMU 1007 may connect to card reader 1055 through bus 1057 and may thereby obtain player card information and transmit the information over the network through bus 1041. Gaming activity information may be transferred by the base game integrated circuit board 1003 to GMU 1007 where the information may be translated into a network protocol, such as S2S, for transmission to a server, such as a player tracking server, where information about a player's playing activity may be stored in a designated server database.

PIB 1009 includes an integrated circuit board, PID processor, and memory which includes an operating system, such as Windows CE, a player interface program which may be executable by the PID processor together with various input/output (110) drivers for respective devices which connect to PIB 1009, such as player interface devices 1011, and which may further include various games or game components playable on PIB 1009 or playable on a connected network server and PIB 1009 is operable as the player interface. PIB 1009 connects to card reader 1055 through bus 1023, display 1059 through video decoder 1061 and bus 1021, such as an LVDS or VGA bus.

As part of its programming, the PID processor executes coding to drive display 1059 and provide messages and information to a player. Touch screen circuitry interactively connects display 1059 and video decoder 1061 to PIB 1009; such that a player may input information and cause the information to be transmitted to PIB 1009 either on the player's initiative or responsive to a query by PIB 1009. Additionally soft keys 1065 connect through bus 1017 to PIB 1009 and operate together with display 1059 to provide information or queries to a player and receive responses or queries from the player. PIB 1009, in tum, communicates over the CMS/SMS network through Ethernet switch 1031 and busses 1035, 1039 and with respective servers, such as a player tracking server.

Player interface devices 1011 are linked into the virtual private network of the system components in gaming machine 1001. The system components include the iView processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iView processing board and game monitoring unit (GMU) processing board. The GMU and iView can combined into one like the commercially available Bally GTM iView device. This device may have a video mixing technology to mix the EGM processor's video signals with the iView display onto the top box monitor or any monitor on the gaming device.

Figure 23:
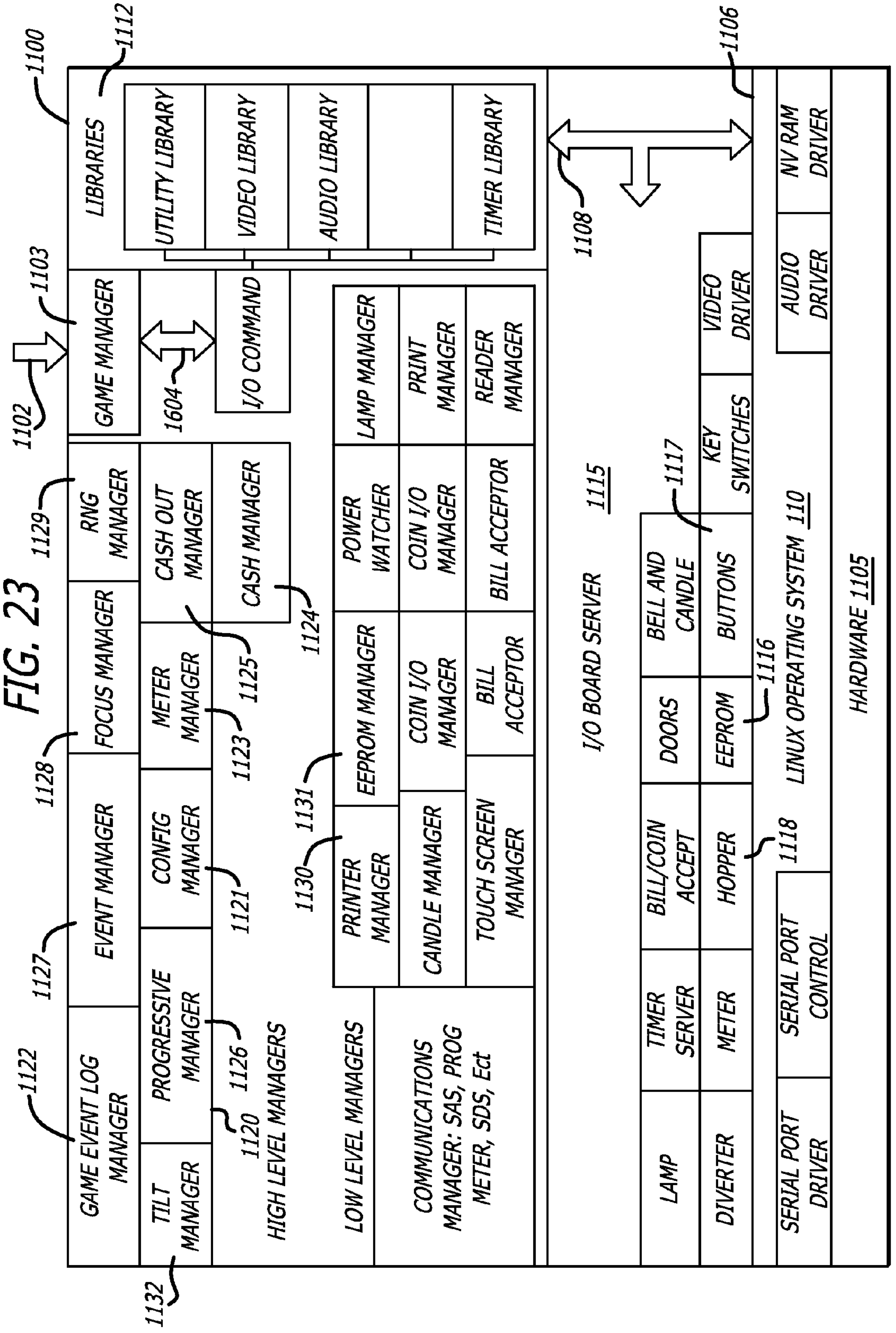
FIG. 23 is a block diagram of the logical components of a gaming kernel in accordance with one or more embodiments.

In accordance with one or more embodiments, FIG. 23 is a functional block diagram of a gaming kernel 1100 of a game program under control of base game integrated circuit board 1103. The game program uses gaming kernel 1100 by calling into application programming interface (API) 1102, which is part of game manager 1103. The components of game kernel 1100 as shown in FIG. 23 are only illustrative, and should not be considered limiting. For example, the number of managers may be changed, additional managers may be added or some managers may be removed without deviating from the scope and spirit of the disclosure.

As shown in the example, there are three layers: a hardware layer 1105; an operating system layer 1110, such as, but not limited to, Linux; and a game kernel layer 1100 having game manager 1103 therein. In one or more embodiments, the use of a standard operating system 1110, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 1100 executes at the user level of the operating system 1110, and itself contains a major component called the I/O Board Server 1115. To properly set the bounds of game application software (making integrity checking easier), all game applications interact with gaming kernel 1100 using a single API 1102 in game manager 1103. This enables game applications to make use of a well-defined, consistent interface, as well as making access points to gaming kernel 1100 controlled, where overall access is controlled using separate processes.

For example, game manager 1103 parses an incoming command stream and, when a command dealing with I/O comes in (arrow 1104), the command is sent to an applicable library routine 1112. Library routine 1112 decides what it needs from a device, and sends commands to I/O Board Server 1115 (see arrow 1108). A few specific drivers remain in operating system 1110's kernel, shown as those below line 1106. These are built-in, primitive, or privileged drivers that are (i) general (ii) kept to a minimum and (iii) are easier to leave than extract. In such cases, the low-level communications is handled within operating system 1110 and the contents passed to library routines 1112.

Thus, in a few cases library routines may interact with drivers inside operating system 1110, which is why arrow 1108 is shown as having three directions (between library utilities 1112 and I/O Board Server 1115, or between library utilities 1112 and certain drivers in operating system 1110). No matter which path is taken, the logic needed to work with each device is coded into modules in the user layer of the diagram. Operating system 1110 is kept as simple, stripped down, and common across as many hardware platforms as possible. The library utilities and user-level drivers change as dictated by the game cabinet or game machine in which it will run. Thus, each game cabinet or game machine may have an base game integrated circuit board 1503 connected to a unique, relatively dumb, and as inexpensive as possible I/O adapter board 1540, plus a gaming kernel 1100 which will have the game-machine-unique library routines and I/O Board Server 1115 components needed to enable game applications to interact with the gaming machine cabinet. Note that these differences are invisible to the game application software with the exception of certain functional differences (i.e., if a gaming cabinet has stereo sound, the game application will be able make use of API 1102 to use the capability over that of a cabinet having traditional monaural sound).

Game manager 1103 provides an interface into game kernel 1100, providing consistent, predictable, and backwards compatible calling methods, syntax, and capabilities by way of game application API 1102. This enables the game developer to be free of dealing directly with the hardware, including the freedom to not have to deal with low-level drivers as well as the freedom to not have to program lower level managers 1130, although lower level managers 1130 may be accessible through game manager 1103' s interface 1102 if a programmer has the need. In addition to the freedom derived from not having to deal with the hardware level drivers and the freedom of having consistent, callable, object-oriented interfaces to software managers of those components (drivers), game manager 1103 provides access to a set of upper level managers 1120 also having the advantages of consistent callable, object-oriented interfaces, and further providing the types and kinds of base functionality required in casino-type games. Game manager 1103, providing all the advantages of its consistent and richly functional interface 1102 as supported by the rest of game kernel 1100, thus provides a game developer with a multitude of advantages.

Game manager 1103 may have several objects within itself, including an initialization object (not shown). The initialization object performs the initialization of the entire game machine, including other objects, after game manager 1103 has started its internal objects and servers in appropriate order. In order to carry out this function, the kernel's configuration manager 1121 is among the first objects to be started; configuration manager 1121 has data needed to initialize and correctly configure other objects or servers.

The upper level managers 1120 of game kernel 1100 may include game event log manager 1122 which provides, at the least, a logging or logger base class, enabling other logging objects to be derived from this base object. The logger object is a generic logger; that is, it is not aware of the contents of logged messages and events. The log manager's (822) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 1123 manages the various meters embodied in the game kernel 1100. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 1123 receives its initialization data for the meters, during start-up, from configuration manager 1121. While running, the cash in (1124) and cash out (1125) managers call the meter manager's (1123) update functions to update the meters. Meter manager 1123 will, on occasion, create backup copies of the soft meters by storing the soft meters' readings in EEPROM. This is accomplished by calling and using EEPROM manager 1131.

In accordance with still other embodiments, progressive manager 1126 manages progressive games playable from the game machine. Event manager 1127 is generic, like log manager 1122, and is used to manage various gaming machine events. Focus manager 1128 correlates which process has control of various focus items. Tilt manager 1132 is an object that receives a list of errors (if any) from configuration manager 1121 at initialization, and during game play from processes, managers, drivers, etc. that may generate errors. Random number generator manager 1129 is provided to allow easy programming access to a random number generator (RNG), as a RNG is required in virtually all casino-style (gambling) games. RNG manager 1129 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 1125 has the responsibility of configuring and managing monetary output devices. During initialization, cash out manager 1125, using data from configuration manager 1121, sets the cash out devices correctly and selects any selectable cash out denominations. During play, a game application may post a cash out event through the event manager 1127 (the same way all events are handled), and using a call-back posted by cash out manager 1125, cash out manager 1125 is informed of the event. Cash out manager 1125 updates the credit object, updates its state in non-volatile memory, and sends an appropriate control message to the device manager that corresponds to the dispensing device. As the device dispenses dispensable media, there will typically be event messages being sent back and forth between the device and cash out manager 1125 until the dispensing finishes, after which cash out manager 1125, having updated the credit manager and any other game state (such as some associated with meter manager 1123) that needs to be updated for this set of actions, sends a cash out completion event to event manager 1127 and to the game application thereby. Cash in manager 1124 functions similarly to cash out manager 1125, only controlling, interfacing with, and taking care of actions associated with cashing in events, cash in devices, and associated meters and crediting.

In a further example, in accordance with one or more embodiments, I/O server 1115 may write data to the gaming machine EEPROM memory, which is located in the gaming machine cabinet and holds meter storage that must be kept even in the event of power failure. Game manager 1103 calls the I/O library functions to write data to the EEPROM. The I/O server 1115 receives the request and starts a low priority EEPROM thread 1116 within I/O server 1115 to write the data. This thread uses a sequence of 11 bit command and data writes to the EEPROM device to write the appropriate data in the proper location within the device. Any errors detected will be sent as IPC messages to game manager 1103. All of this processing is asynchronous.

In accordance with one embodiment, button module 1117 within I/O server 1115, polls (or is sent) the state of buttons every 2 ms. These inputs are debounced by keeping a history of input samples. Certain sequences of samples are required to detect a button was pressed, in which case the I/O server 1115 sends an inter-process communication event to game manager 1103 that a button was pressed or released. In some embodiments, the gaming machine may have intelligent distributed I/O which debounces the buttons, in which case button module 1117 may be able to communicate with the remote intelligent button processor to get the button events and simply relay them to game manager 1103 via IPC messages. In still another embodiment, the I/O library may be used for payout requests from the game application. For example, hopper module 1118 must start the hopper motor, constantly monitor the coin sensing lines of the hopper, debounce them, and send an IPC message to the game managerl 103 when each coin is paid.

Further details, including disclosure of lower level fault handling and/or processing, are included in U.S. Pat. No. 7,351,151 entitled "Gaming Board Set and Gaming Kernel for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 24A:
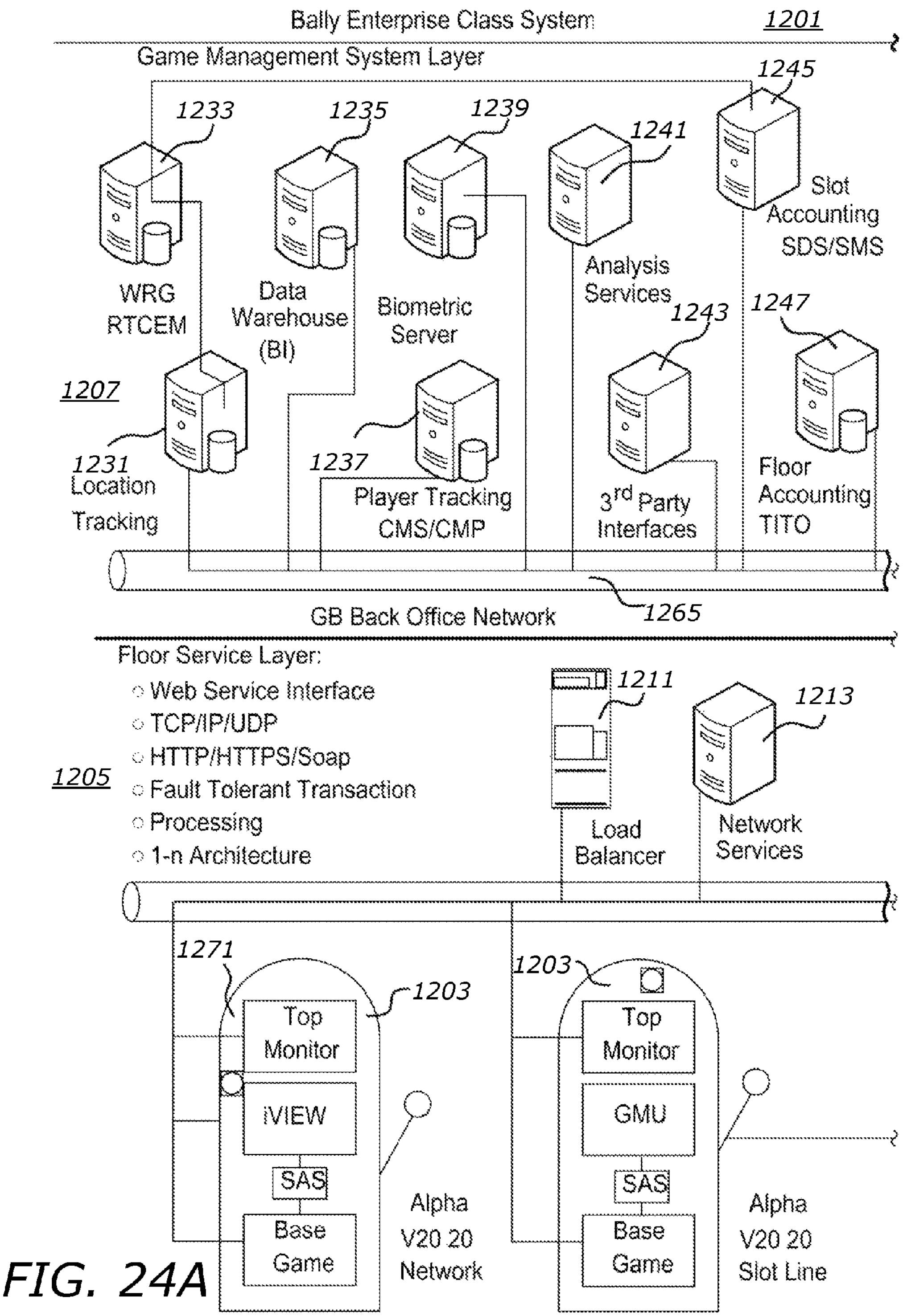
FIGS. 24*a* is a schematic block diagram showing the hardware elements of a networked gaming system in accordance with one or more embodiments.
Figure 24B:
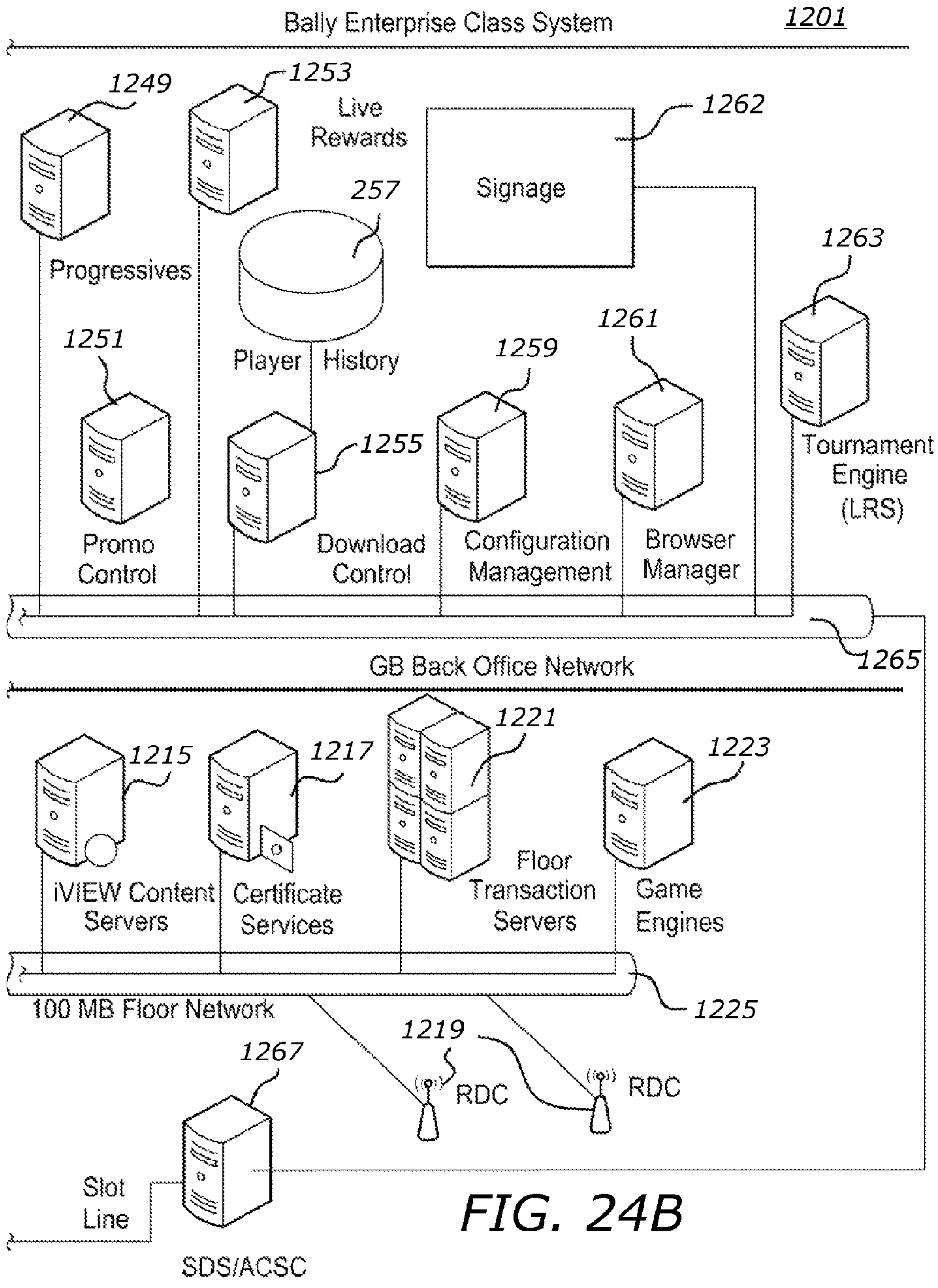
FIGS. 24*b* is a schematic block diagram showing the hardware elements of a networked gaming system in accordance with one or more embodiments.

Referring to FIGS. 24*a*-*b*, enterprise gaming system 1201 is shown in accordance with one or more embodiments. Enterprise gaming system 1201 may include one casino or multiple locations and generally includes a network of gaming machines 1203, floor management system (SMS) 1205, and casino management system (CMS) 1207. SMS 1205 may include load balancer 1211, network services servers 1213, player interface (iView) content servers 1215, certificate services server 125, floor radio dispatch receiver/transmitters (RDC) 1219, floor transaction servers 1221 and game engines 1223, each of which may connect over network bus 1225 to gaming machines 1203. CMS 1207 may include location tracking server 1231, WRG RTCEM server 1233, data warehouse server 1235, player tracking server 1237, biometric server 1239, analysis services server 1241, third party interface server 1243, slot accounting server 1245, floor accounting server 1247, progressives server 1249, promo control server 1251, feature game (such as Bally Live Rewards) server 1253, download control server 1255, player history database 1257, configuration management server 1259, browser manager 1261, tournament engine server 1263 connecting through bus 1265 to server host 1267 and gaming machines 1203. The various servers and gaming machines 1203 may connect to the network with various conventional network connections (such as, for example, USB, serial, parallel, RS485, Ethernet). Additional servers which may be incorporated with CMS 1207 include a responsible gaming limit server (not shown), advertisement server (not shown), and a control station server (not shown) where an operator or authorized personnel may select options and input new programming to adjust each of the respective servers and gaming machines 1203. SMS 1205 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 1203 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 1207 and/or SMS 1205 servers and devices, firmware, media, operating systems, and configurations may be downloaded to the system components of respective gaming machines for upgrading or managing floor content and offerings in accordance with operator selections or automatically depending upon CMS 1207 and SMS 1205 master programming. The data and programming updates to gaming machines 1203 are authenticated using conventional techniques prior to install on the system components.

In various embodiments, any of the gaming machines 1203 may be a mechanical reel spinning slot machine or a video slot machine or a gaming machine offering one or more of the above described games including a group play game. Alternately, gaming machines 1203 may provide a game with a simulated musical instrument interface as a primary or base game or as one of a set of multiple primary games selected for play by a random number generator. A gaming system of the type described above also allows a plurality of games in accordance with the various embodiments of the disclosure to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Play Gaming," filed on Nov. 9, 2007, which is hereby incorporated by reference in its entirety for all purposes.

Figure 25:
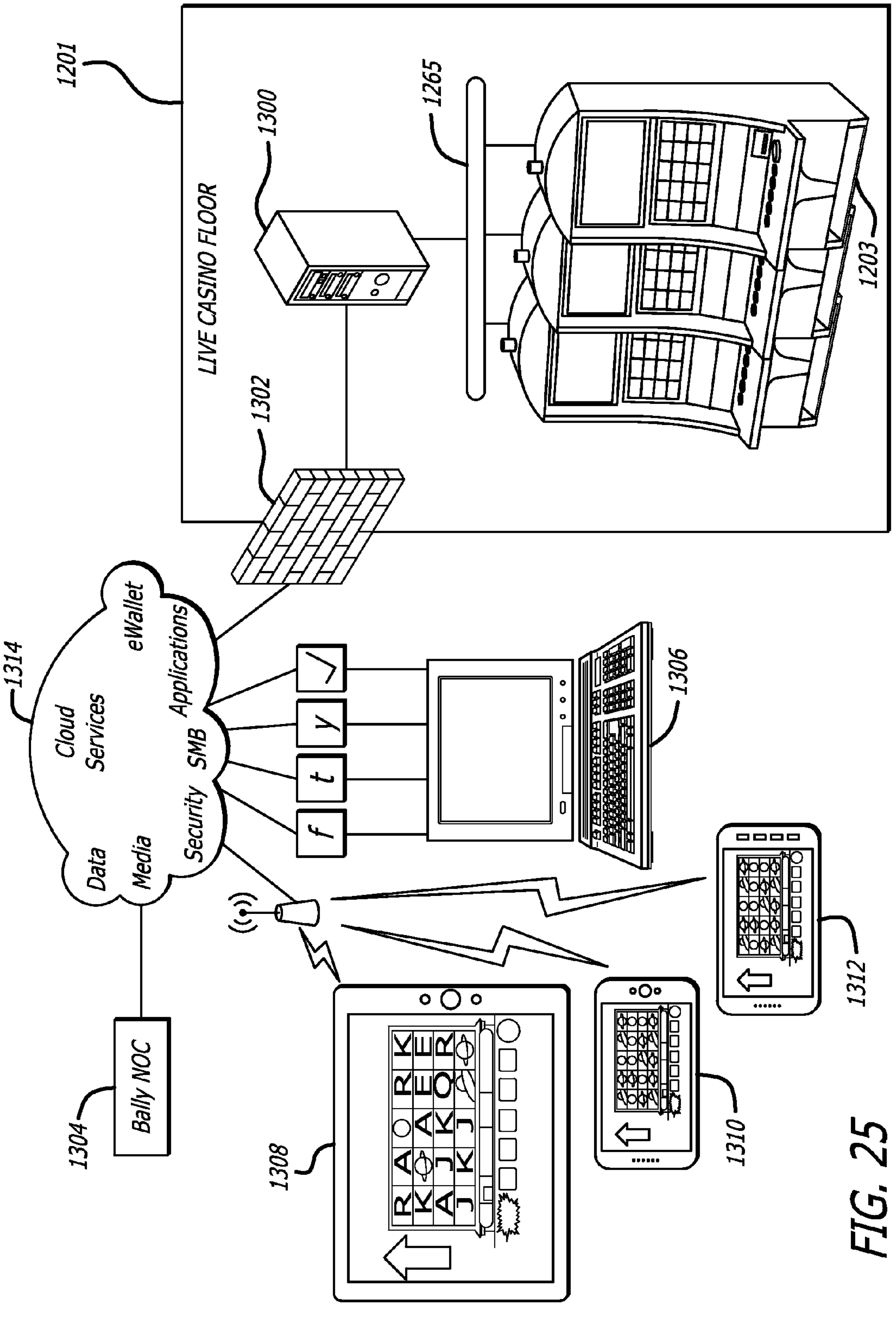
FIG. 25 is a diagram showing an example of an architecture for tying a casino enterprise network to an external provider of games and content to Internet or broadband communication capable devices in accordance with one or more embodiments.

All or portions of the present disclosure may also be implemented or promoted by or through a system as suggested in FIG. 25. At 1201 is the gaming system of FIGS. 23*a-b*, which may be hosted at a casino property enterprise, across several casino enterprises or by a third party host. As described above, the gaming system 1201 has a network communication bus 1265 providing for communication between the gaming terminals 1203 and various servers. To provide the functionality illustrated in FIG. 25, a bonusing server 1300, such as a Bally Elite Bonusing Server is connected to the network communication bus 1265 (FIGS. 24*a-b*) for communication to the gaming system 1201, the gaming terminals 1203 and the various servers and other devices as described above. Through a secure network firewall 1302 the bonusing server 1300 is in communication with a cloud computing/storage service 1304 which may be hosted by the casino enterprise, a licensed third party or if permitted by gaming regulators an unlicensed provider. For example the cloud service 1304 may be as provided by Microsoft® Private Cloud Solutions offered by Microsoft Corp. of Redmond, Wash., USA. The cloud service 1304 provides various applications which can be accessed and delivered to, for example, personal computers 1306, portable computing devices such as computer tablets 1308, personal digital assistants (PDAs) 1310 and cellular devices 1312 such as telephones and smart phones. As but an example, the cloud service 1304 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonusing or comps to players, or other applications. The cloud service 1304 includes security provide for secure communication with the cloud service 1304 between the player/users and the cloud service 1304 and between the cloud service 1304 and the gaming system 901. Security applications may be through encryption, the use of personal identification numbers (PINS) or other devices and systems. As suggested in FIG. 25, the cloud service 1314 stores player/user data retrieved from players/users and from the gaming system 1201.

The players/users may access the cloud service 1304 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace, LinkedIn or the like.

As but an example, a player/user may have a player account with a casino enterprise Z. That account may include data such as the player's credit level, their rating and their available comps. The account may further track any certificates, and the present value thereof, the player may have won as a result of the playing a game according to the present disclosure. At their smart phone 1312 the player/user sends a request to the clout service 1304 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 1304 forwards the inquiry to the bonusing servicer 1300 which, in tum, confirms the PIN and retrieves the requested information from the data warehouse or player tracking CMS/CMP server 937. Alternatively the data may be stored in the cloud service 1304 and routinely updated from the data warehouse 935 or player tracking CMS/CMP server 937. In this instance the request would be responded to from data residing with the cloud service 1304. The information is formatted by the cloud server 1304 application and delivered to the player/user. The delivery may be formatted based upon the player/user's device operating system (OS), display size or the like.

The cloud service 1300 may also host game applications to provide virtual instances of games for free, promotional, or where permitted, P2P (Pay to Play) supported gaming. Third party developers may also have access to placing applications with the cloud service 1304 through, for example a national operations center (Bally NOC 1314). A game software manufacturer such as Bally Gaming, Inc. may also provide game applications on its own or on behalf of the casino enterprise.

Other media such as advertising, notices (such as an upcoming tournament) may also be provided to the cloud service 1304. When a player/user accesses the cloud service 1304 certain media may be delivered to the player/user in a manner formatted for their application and device.

Various further aspects can be used with the presently disclosed device and method. For example, in one embodiment of a gesture-enhanced input device, a video-based button deck can be provided for use in games on the Alpha II gaming platform, including stepper-based games, video-based games, card-based games (e.g., black jack, poker, and the like), and ticket based games (e.g., keno, bingo, and the like). In various embodiments, the display of the gesture-enhanced input device is offered as an upgrade or a standard feature. A video-based selection display of the gesture-enhanced input device provides simplified set-up and configuration, as well as new game play offerings not supported by other panel. In one embodiment, the gesture-enhanced input device actually moves the virtual buttons to a player's present location on the touch-enabled deck. In this regard, the gesture-enhanced input device is customizable to an individual player's needs, includes button size, shape, location, speed of play, and the like. In one embodiment, a gesture-enhanced input device is configured to resize a virtual button deck to compensate for the height, arm length, hand size, finger size, and finger length of a player. In one such embodiment of the gesture enhanced input device, aspects of the virtual button deck are resized based upon player performance of the game being played. The importance of the player (e.g., gold club member, and the like) may also be used as criteria for resizing button deck characteristics and/or adding or deleting various button deck functions or attributes.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

From the foregoing it will be appreciated that, although specific embodiments have been described herein for purposes of illustration, various modifications may be made without deviating from the spirit and scope of the teachings. Accordingly, the claims are not limited by the disclosed embodiments.

What is claimed:

1. A multi-touch, multi-grab game play system, comprising:

a display subsystem having a display screen, the display subsystem configured to display images related to one or more games to be played on at least a first game playing surface, the images including a virtual game layout including a number of demarcations of at least one area associated with the play of the one or more games;

a sensor subsystem including a surface acoustic wave system configured to detect multiple touch, multi-grab gestures from non-capacitive objects and capacitive objects, wherein gestures include simultaneous touches by multiple fingers and simultaneous touches by multiple hands that enable users to grab and interact with multiple pieces of digital information simultaneously, and wherein simultaneous touches by multiple fingers of one hand generates a virtual x-ray scope that appears to look inside a displayed image on the display while another hand performs another operation using multiple touches; and at least one computing subsystem, the at least one computing subsystem communicatively coupled to the display subsystem to control the images displayed by the display subsystem, the at least one computing subsystem communicatively coupled to the sensor subsystem to receive information indicative of the multiple touch, multi-grab gestures sensed by the sensor subsystem.

2. The system of claim 1, wherein the multiple touch gesturing is used to capture coins of varying value.

3. The system of claim 1, wherein the system includes a plurality of banks.

4. The system of claim 1, wherein the banks accept a single particular value coin.

5. The system of claim 1, wherein the surface acoustic wave system employs a pair of transducers along perpendicular axes of a panel and reflectors that reflect an electrical signal sent from a sending transducer of the pair of transducers to a receiving transducer of the pair of transducers.

6. The system of claim 5, wherein the receiving transducer of the pair of transducers measures disturbances of an electrical wave.

7. The system of claim 6, wherein the system includes a processor and a driver that determine position data based on the electrical wave disturbances, wherein the position data is mapped atop a virtual game layout.

8. The system of claim 1, wherein placement of different physical objects on the first game playing surface triggers different types of digital responses.

9. The system of claim 8, placement of different physical objects on the first game playing surface triggers different types of digital responses including transfer of digital content.

10. The system of claim 1, further comprising:
at least a first game playing surface on which at least a portion of the one or more games is playable; and
at least a second game playing surface on which at least a portion of the one or more games is playable, wherein the display subsystem includes a first display device and at least a second display device, the first display device positioned to display the images on or under the first game playing surface and the second display device positioned to display the images on or under the second game playing surface.

11. The system of claim 1, wherein the display subsystem and the sensor subsystem are remotely located from the computing subsystem.

12. The system of claim 1, wherein the display subsystem and the sensor subsystem are located in a wireless communications device.

13. The system of claim 1, wherein the display subsystem and the sensor subsystem are collocated remotely from a gaming floor of a gaming premises.

14. The system of claim 1, wherein the virtual game layout comprises a casino table game.

15. The system of claim 1, wherein the at least one computing subsystem controls the display subsystem to display images of a menu including game time features.

16. The system of claim 1, wherein the at least one computing subsystem controls the display subsystem to display images indicative of participant account information for at least one participant in the at least one game.

17. The system of claim 1, wherein the at least one computing subsystem controls the display subsystem to display images indicative of multiple touch gestures.

18. The system of claim 1, wherein the computing subsystem is configured to cause the display subsystem to display instructive information regarding the at least one game.

19. A multi-touch game play method, comprising:
providing a display subsystem configured to display images related to one or more games to be played on at least a first game playing surface, the images including a virtual game layout including a number of demarcations of at least one area associated with the play of the one or more games;
providing a sensor subsystem including a surface acoustic wave system configured to detect multiple touch, multi-grab gestures from non-capacitive objects and capacitive objects, wherein gestures include simultaneous touches by multiple fingers that enable users to create a virtual net that lassos objects on the first game playing surface that selects lassoed objects inside the virtual net that are not directly touched by any of the simultaneous touches by the multiple fingers; and
providing at least one computing subsystem, the at least one computing subsystem communicatively coupled to the display subsystem to control the images displayed by the display subsystem, the at least one computing subsystem communicatively coupled to the sensor subsystem to receive information indicative of the multiple touch, multi-grab gestures sensed by the sensor subsystem.

20. The method of claim 19, wherein the multiple touch gesturing is used to capture coins of varying value and wherein the system includes a plurality of banks.

* * * * *